(12) United States Patent
Knox

(10) Patent No.: US 12,045,214 B2
(45) Date of Patent: Jul. 23, 2024

(54) DATABASE VALIDATION AND REPAIR TOOL

(71) Applicant: Agile Companion Technologies Ltd., West Sussex (GB)

(72) Inventor: Christopher Knox, West Sussex (GB)

(73) Assignee: Agile Companion Technologies Ltd. (GB)

( * ) Notice: Subject to any disclaimer, the term of this patent is extended or adjusted under 35 U.S.C. 154(b) by 94 days.

(21) Appl. No.: 17/723,940

(22) Filed: Apr. 19, 2022

(65) Prior Publication Data

US 2022/0335023 A1 Oct. 20, 2022

(30) Foreign Application Priority Data

Apr. 19, 2021 (GB) ..................................... 2105597

(51) Int. Cl.
*G06F 9/44* (2018.01)
*G06F 8/77* (2018.01)
*G06F 16/215* (2019.01)

(52) U.S. Cl.
CPC .............. *G06F 16/215* (2019.01); *G06F 8/77* (2013.01)

(58) Field of Classification Search
None
See application file for complete search history.

(56) References Cited

U.S. PATENT DOCUMENTS

| | | | |
|---|---|---|---|
| 2008/0307262 A1* | 12/2008 | Carlin, III | G06F 16/215 707/999.102 |
| 2012/0102002 A1* | 4/2012 | Sathyanarayana | G06F 16/215 707/687 |
| 2018/0322178 A1* | 11/2018 | Gitelman | G06F 16/2379 |
| 2020/0104122 A1* | 4/2020 | Pechacek | G06F 8/41 |

* cited by examiner

*Primary Examiner* — Qamrun Nahar
(74) *Attorney, Agent, or Firm* — Conley Rose, P.C.

(57) ABSTRACT

A system and method for improving and/or repairing data structures in databases or other structured data such as in project management computer software. Such project management software includes complicated data structures, which are prone to developing inconsistencies and errors over time. The system or method takes snapshots of datasets from the project management software at periodic points in time, ingests the data and maps it to internal data objects. This allows an analytics engine to efficiently perform a range of validation checks for anomalies and other issues that contravene Agile rules by identifying dependencies between individual work task entities and creating links in the data objects to other data objects representing those dependencies. Thus, the system may indicate to the user issues with the data, automate repair of the data structures and provide tools for the user to quickly and efficiently fix the source data.

14 Claims, 27 Drawing Sheets

Scenario Baseline Creation

| | ID | Title | Team | Project Release | Dependencies |
|---|---|---|---|---|---|
| Views | E100 | Epic E100's title | | | |
| | F1001 | Feature F1001's title | Team 1 | Everest | 3 |
| Backlog | F1002 | Feature F1002's title | Team 1 | Everest | 0 |
| Board | F1003 | Feature F1003's title | Team 1 | Everest | 1 |
| ... | F1004 | Feature F1004's title | Team 2 | Everest | 0 |
| ... | F1005 | Feature F1005's title | Team 3 | Everest | 5 |
| ... | F1006 | Feature F1006's title | Team 1 | Everest | |
| ... | E101 | Epic E101's title | | | |
| | F1011 | Feature F1011's title | Team 4 | Yellowstone | 1 |
| | F1012 | Feature F1012's title | Team 4 | Yellowstone | 2 |
| | F1013 | Feature F1013's title | Team 1 | Yellowstone | 4 |
| | F1014 | Feature F1014's title | Team 5 | Yellowstone | 15 |
| | F1015 | Feature F1015's title | Team 3 | Yellowstone | 11 |
| | F1016 | Feature F1016's title | Team 2 | Yellowstone | 3 |

Figure 1A
Prior Art

| | TO DO | IN PROGRESS | CODE REVIEW | DONE |
|---|---|---|---|---|
| Views | Some narrative about Feature 1234, eg the Feature's title | Some narrative about Feature 1332, eg the Feature's title | Some narrative about Feature 1236, eg the Feature's title | Some narrative about Feature 1199, eg the Feature's title |
| Backlog Board ... ... ... | Some narrative about Feature 1235, eg the Feature's title | Some narrative about Feature 1334, eg the Feature's title | | Some narrative about Feature 1201, eg the Feature's title |
| | Some narrative about Feature 1239, eg the Feature's title | | | |

Figure 1B
Prior Art

| Internet Explorer Application | https://www.a_n_other_agile_planning_provider.com |

| F1001 | DEPENDENCIES |

Views

Backlog
Board
...
...
...
...

PREDECESSORS

| ID | Title | Team |
|---|---|---|
| F1134 | This is the Title for Feature F1134 | Team A |
| F1128 | This is the Title for Feature F1128 | Team B |

SUCCESSORS

| ID | Title | Team |
|---|---|---|
| F1401 | This is the Title for Feature F1401 | Team C |

Figure 1C
Prior Art

| | | Feature ID | Program Increment | Iteration | Feature Title | Epic ID: Name | Epic Owner | Team | State | Release Train | Value Stream | Project Release | Movement Reason | Movement Impact |
|---|---|---|---|---|---|---|---|---|---|---|---|---|---|---|
| Incoming [6 Features] | | | | | | | | | | | | | | |
| | New Scope (Committed) [2 Features] | | | | | | | | | | | | | |
| | | F3000 | PI 2 | Iteration 01 | Feature Title of F3000 | E1: Epic #1 | E1 Owner | Team 1 | Committed | RT 1 | VS 1 | PR 1 | Movement Reason for F3000 | Movement Impact for F3000 |
| | | F3001 | PI 2 | Iteration 01 | Feature Title of F3001 | E1: Epic #1 | E1 Owner | Team 1 | Committed | RT 1 | VS 1 | PR 1 | Movement Reason for F3001 | Movement Impact for F3001 |
| | New Scope (Delivered) [4 Features] | | | | | | | | | | | | | |
| | | F3002 | PI 2 | Iteration 01 | Feature Title of F3002 | E1: Epic #1 | E1 Owner | Team 1 | Accepted | RT 1 | VS 1 | PR 1 | Movement Reason for F3002 | Movement Impact for F3002 |
| | | F3003 | PI 2 | Iteration 01 | Feature Title of F3003 | E1: Epic #1 | E1 Owner | Team 1 | Accepted | RT 1 | VS 1 | PR 1 | Movement Reason for F3003 | Movement Impact for F3003 |
| | | F3004 | PI 2 | Iteration 01 | Feature Title of F3004 | E1: Epic #1 | E1 Owner | Team 1 | Accepted | RT 1 | VS 1 | PR 1 | Movement Reason for F3004 | Movement Impact for F3004 |
| | | F3005 | PI 2 | Iteration 01 | Feature Title of F3005 | E1: Epic #1 | E1 Owner | Team 1 | Accepted | RT 1 | VS 1 | PR 1 | Movement Reason for F3005 | Movement Impact for F3005 |
| Outgoing [3 Features] | | | | | | | | | | | | | | |
| | Reallocated (was Committed) [0 Features] | | | | | | | | | | | | | |
| | Other PIs (was Committed) [2 Features] | | | | | | | | | | | | | |
| | | F999 | PI 3 | Iteration 02 | Stayed Committed, Moved out a PI | E7: Epic #7 | E7 Owner | Team 13 | Committed | RT 7 | VS 7 | PR 7 | Movement Reason for F999 | Movement Impact for F999 |
| | | F1001 | PI 3 | Iteration 02 | Stayed Committed, Moved out a PI, Team & changed Release Train | E7: Epic #7 | E7 Owner | Team 13 | Committed | RT 10 | VS 7 | PR 7 | Movement Reason for F1001 | Movement Impact for F1001 |
| | Rejected (was Committed) [1 Features] | | | | | | | | | | | | | |
| | | F10001 | PI 2 | | Feature Title of F10001 | E7: Epic #7 | E7 Owner | Team 13 | Rejected | RT 2 | VS 2 | PR6 | Movement Reason for F10001 | Movement Impact for F10001 |
| | Deleted (was Committed) [1 Features] | | | | | | | | | | | | | |
| | | F10000 | PI 2 | | Feature Title of F10000 | (no Epic assigned) | | | Committed | | | PR6 | | |

| Key | |
|---|---|
| Changed (selection only): | bold |
| Overdue: | bold border |
| Shifted out: | xxx |
| Shifted in: | xxx |
| Missing or Invalid (current): | |

Figure 5

| | | Feature ID | Program Increment | Iteration | Feature Title | Epic ID: Name | Epic Owner | Team | State | Release Train | Value Stream | Project Release | Movement Reason | Movement Impact |
|---|---|---|---|---|---|---|---|---|---|---|---|---|---|---|
| Incoming [6 Features] | | | | | | | | | | | | | | |
| Outgoing [3 Features] | | | | | | | | | | | | | | |

| Key | |
|---|---|
| Changed (selection only): | bold |
| Overdue: | solid border |
| Shifted out: | xxx |
| Shifted in: | xxx |
| Missing or invalid (current): | |

Figure 6

| | | Feature ID | Program Increment | Iteration | Feature Title | Epic ID: Name | Epic Owner | Team | State | Release Train | Value Stream | Project Release | Movement Reason | Movement Impact |
|---|---|---|---|---|---|---|---|---|---|---|---|---|---|---|
| Incoming [6 Features] | | | | | | | | | | | | | | |
| | New Scope (Committed) [2 Features] | | | | | | | | | | | | | |
| | New Scope (Delivered) [4 Features] | | | | | | | | | | | | | |
| Outgoing [3 Features] | | | | | | | | | | | | | | |
| | Reallocated (was Committed) [0 Features] | | | | | | | | | | | | | |
| | Other PIs (was Committed) [2 Features] | | | | | | | | | | | | | |
| | Rejected (was Committed) [1 Feature] | | | | | | | | | | | | | |
| | Deleted (was Committed) [1 Features] | | | | | | | | | | | | | |

| Key | |
|---|---|
| Changed (selection only): | bold |
| Overdue: | solid border |
| Shifted out: | xxxx |
| Shifted in: | xxxx |
| Missing or invalid (current): | |

Figure 7

| Project Release | Team | Metrics (Cumulative) | No Planned Iteration | Iteration 01 | Iteration 02 | Pi 2 Iteration 03 | Iteration 04 | Iteration 05 | Iteration IP |
|---|---|---|---|---|---|---|---|---|---|
| PR 1 | | | | | | | | | |
| PR 2 | | | | | | | | | |
| PR 7 | | | | | | | | | |
| PR2 | | | | | | | | | |
| PR6 | | | | | | | | | |
| | | Original Commitment | 15 | 1 | 4 | 9 | 12 | 14 | 15 | 15 |
| | | Delivered | 6 | 0 | 0 | 2 | 4 | 6 | 6 | 6 |
| | PLANNED | % Delivered | 40% | 0% | 0% | 22% | 33% | 43% | 40% | 40% |
| GRAND | TOTALS | Delivered Feature Slip | 5 | 0 | 0 | 0 | 2 | 5 | 5 | 5 |
| TOTALS | | Current Commitment | 5 | 0 | 0 | 0 | 1 | 3 | 5 | 5 |
| | | Current Plan | 11 | 0 | 0 | 2 | 5 | 9 | 11 | 11 |
| | UNPLANNED | Unplanned Commitment | 3 | 0 | 2 | 2 | 3 | 3 | 3 | 3 |
| | TOTALS | Delivered | 7 | 0 | 6 | 6 | 7 | 7 | 7 | 7 |

Figure 9

| Project Release | Team | Metrics (Cumulative) | | No Planned Iteration | Iteration 01 | Iteration 02 | PI 2 Iteration 03 | Iteration 04 | Iteration 05 | Iteration IP |
|---|---|---|---|---|---|---|---|---|---|---|
| PR 1 | | | | | | | | | | |
| | | Planned (Previous Baseline) | | | | | | | | |
| | | Original Commitment | | 8 | 0 | 2 | 5 | 7 | 8 | 8 | 8 |
| | | Delivered | | 4 | 0 | 0 | 2 | 4 | 4 | 4 | 4 |
| | PLANNED | % Delivered | | 50% | - | 0% | 40% | 57% | 50% | 50% | 50% |
| | TOTALS | Delivered Feature Slip | | 2 | 0 | 0 | 0 | 2 | 2 | 2 | 2 |
| | | Current Commitment | | 3 | 0 | 0 | 0 | 0 | 2 | 3 | 3 |
| | | Current Plan | | 7 | 0 | 0 | 2 | 4 | 6 | 7 | 7 |
| | | Unplanned (Current Baseline) | | | | | | | | |
| | UNPLANNED | Unplanned Commitment | | 3 | 0 | 2 | 2 | 3 | 3 | 3 | 3 |
| | TOTALS | Delivered | | 4 | 0 | 4 | 4 | 4 | 4 | 4 | 4 |
| PR 2 | | | | | | | | | | |
| PR 7 | | | | | | | | | | |
| PR2 | | | | | | | | | | |
| PR6 | | | | | | | | | | |
| | | Original Commitment | | 15 | 1 | 4 | 9 | 12 | 14 | 15 | 15 |
| | | Delivered | | 6 | 0 | 0 | 2 | 4 | 6 | 6 | 6 |
| | PLANNED | % Delivered | | 40% | 0% | 0% | 22% | 33% | 43% | 40% | 40% |
| GRAND | TOTALS | Delivered Feature Slip | | 5 | 0 | 0 | 0 | 2 | 5 | 5 | 5 |
| TOTALS | | Current Commitment | | 5 | 0 | 0 | 0 | 1 | 3 | 5 | 5 |
| | | Current Plan | | 11 | 0 | 0 | 2 | 5 | 9 | 11 | 11 |
| | UNPLANNED | Unplanned Commitment | | 3 | 0 | 2 | 2 | 3 | 3 | 3 | 3 |
| | TOTALS | Delivered | | 7 | 0 | 6 | 6 | 7 | 7 | 7 | 7 |

Figure 10

| Project Release | Team | Metrics (Cumulative) | | Iteration 01 | Iteration 02 | PI 2 Iteration 03 | Iteration 04 | Iteration 05 | Iteration IP |
|---|---|---|---|---|---|---|---|---|---|
| PR 1 | | | | | | | | | |
| | | Planned (Previous Baseline) | | | | | | | |
| | Team 1 | | | | | | | | |
| | | Original Commitment | 6 | 2 | 4 | 6 | 6 | 6 | 6 |
| | | Delivered | 3 | 0 | 1 | 3 | 3 | 3 | 3 |
| | | % Delivered | 50% | 0% | 25% | 50% | 50% | 50% | 50% |
| | | Delivered Feature Slip | 2 | 0 | 0 | 2 | 2 | 2 | 2 |
| | | Currently Committed | 2 | 0 | 0 | 0 | 1 | 2 | 2 |
| | | Current Plan | 5 | 0 | 1 | 3 | 4 | 5 | 5 |
| | Team 2 | | | | | | | | |
| | | Original Commitment | 2 | 0 | 1 | 1 | 2 | 2 | 2 |
| | | Delivered | 1 | 0 | 1 | 1 | 1 | 1 | 1 |
| | | % Delivered | 50% | | 100% | 100% | 50% | 50% | 50% |
| | | Delivered Feature Slip | 0 | 0 | 0 | 0 | 0 | 0 | 0 |
| | | Currently Committed | 1 | 0 | 0 | 0 | 1 | 1 | 1 |
| | | Current Plan | 2 | 0 | 1 | 1 | 2 | 2 | 2 |
| | PLANNED TOTALS | Original Commitment | 8 | 2 | 5 | 7 | 8 | 8 | 8 |
| | | Delivered | 4 | 0 | 2 | 4 | 4 | 4 | 4 |
| | | % Delivered | 50% | 0% | 40% | 57% | 50% | 50% | 50% |
| | | Delivered Feature Slip | 2 | 0 | 0 | 2 | 2 | 2 | 2 |
| | | Current Commitment | 3 | 0 | 0 | 0 | 2 | 3 | 3 |
| | | Current Plan | 7 | 0 | 2 | 4 | 6 | 7 | 7 |
| | | Unplanned (Current Baseline) | | | | | | | |
| | UNPLANNED TOTALS | Unplanned Commitment | 3 | 2 | 2 | 3 | 3 | 3 | 3 |
| | | Delivered | 4 | 4 | 4 | 4 | 4 | 4 | 4 |

Figure 11

| Project Release | Team | Metrics (Cumulative) | No Planned Iteration | Iteration 01 | Iteration 02 | Iteration 03 | Iteration 04 | Iteration 05 | Iteration IP |
|---|---|---|---|---|---|---|---|---|---|
| PR 1 | | Planned (Previous Baseline) | | | | | PI 2 | | |
| | Team 1 | | | | | | | | |
| | | Original Commitment | | F10<br>F3006 | F1<br>F13 | F5<br>F14 | | | |
| | | Delivered | | | F13 | F10 (+2)<br>F14 | | | |
| | | Current Commitment | | | | | F3006 | F1 | |
| | | Original Commitment | 6 | 0 | 2 | 4 | 6 | 6 | 6 | 6 |
| | | Delivered | 3 | 0 | 0 | 1 | 3 | 3 | 3 | 3 |
| | | % Delivered | 50% | - | 0% | 25% | 50% | 50% | 50% | 50% |
| | | Delivered Feature Slip | 2 | 0 | 0 | 0 | 2 | 2 | 2 | 2 |
| | | Currrently Committed | 2 | 0 | 0 | 0 | 0 | 1 | 2 | 2 |
| | | Current Plan | 5 | 0 | 0 | 1 | 3 | 4 | 5 | 5 |
| | Team 2 | | | | | | | | | |
| | | Original Commitment | 2 | 0 | 0 | 1 | 1 | 2 | 2 | 2 |
| | | Delivered | 1 | 0 | 0 | 1 | 1 | 1 | 1 | 1 |
| | | % Delivered | 50% | - | - | 100% | 100% | 50% | 50% | 50% |
| | | Delivered Feature Slip | 0 | 0 | 0 | 0 | 0 | 0 | 0 | 0 |
| | | Currently Committed | 1 | 0 | 0 | 0 | 0 | 1 | 1 | 1 |
| | | Current Plan | 2 | 0 | 0 | 1 | 1 | 2 | 2 | 2 |
| | PLANNED TOTALS | Original Commitment | 8 | 0 | 2 | 5 | 7 | 8 | 8 | 8 |
| | | Delivered | 4 | 0 | 0 | 2 | 4 | 4 | 4 | 4 |
| | | % Delivered | 50% | - | 0% | 40% | 57% | 50% | 50% | 50% |
| | | Delivered Feature Slip | 2 | 0 | 0 | 0 | 2 | 2 | 2 | 2 |
| | | Current Commitment | 3 | 0 | 0 | 0 | 0 | 2 | 3 | 3 |
| | | Current Plan | 7 | 0 | 0 | 2 | 4 | 6 | 7 | 7 |

Figure 12

| Project Release | Team | Metrics (Cumulative) | | PI 2 | | | | | |
|---|---|---|---|---|---|---|---|---|---|
| | | | | Iteration 01 | Iteration 02 | Iteration 03 | Iteration 04 | Iteration 05 | Iteration IP |
| | | Unplanned (Current Baseline) | | | | | | | |
| | Team 1 | | | | | | | | |
| | | Outstanding Commitment | 3 | 2 | 2 | 3 | 3 | 3 | 3 |
| | | Delivered | 4 | 4 | 4 | 4 | 4 | 4 | 4 |
| | UNPLANNED | Unplanned Commitment | 3 | 2 | 2 | 3 | 3 | 3 | 3 |
| | TOTALS | Delivered | 4 | 4 | 4 | 4 | 4 | 4 | 4 |

Figure 13

| Project Release | Team | Metrics (Cumulative) | | No Planned Iteration | Iteration 01 | Iteration 02 | PI 2 Iteration 03 | Iteration 04 | Iteration 05 | Iteration IP |
|---|---|---|---|---|---|---|---|---|---|---|
| | | Unplanned (Current Baseline) | | | | | | | | |
| | Team 1 | | | | | | | | | |
| | | Unplanned Commitment | | | ▨▨▨ F3000 F3001 | | ▨▨▨ F4 | | | |
| | | Delivered | | | ▨▨▨ F3002 F3003 F3004 F3005 | | | | | |
| | | Outstanding Commitment | 3 | 0 | 2 | 2 | 3 | 3 | 3 | 3 |
| | | Delivered | 4 | 0 | 4 | 4 | 4 | 4 | 4 | 4 |
| | UNPLANNED | Unplanned Commitment | 3 | 0 | 2 | 2 | 3 | 3 | 3 | 3 |
| | TOTALS | Delivered | 4 | 0 | 4 | 4 | 4 | 4 | 4 | 4 |

DATABASE VALIDATION AND REPAIR TOOL

CROSS-REFERENCE TO RELATED APPLICATIONS

The present application claims priority to United Kingdom patent application No. GB2105597.5 filed Apr. 19, 2021, entitled "Software Application and Related Methods" which is incorporated herein by reference in its entirety.

TECHNICAL FIELD

The present disclosure relates to a software application and related methods, and more particularly to a software tool that validates and repairs a database or other structured data store. The tool leverages dependencies in the structure of the database and temporal relationships between snapshots of the data records to analyse issues in the database and to automatically repair or generate user selectable controls to repair the identified issues. The tool may be used in conjunction with software providing Agile project management capabilities.

BACKGROUND

There are many software applications in use where user data is captured and stored in an underlying master relational database. The data may be validated when captured. However once stored there is often little attempt to validate the data globally. Added to which, the user may be continually updating, revising and adding to the data, and little attempt is made in known systems to validate the data as it evolves over time. Examples include software applications that assist users in managing projects. In particular, various Agile management tools exist, two common leading examples are listed below. These provide data entry/update with database repositories (typically cloud hosted). The user interface is web based, offering a more limited user experience than a traditional Application.

The two below—"Rally" and "Jira"—provide an Agile management tool suite that offers tools such as project planning, task creation and management, and reporting, and incorporates a "plug-in" environment for other companies to sell their own widgets.

https://www.broadcom.com/products/software/agile-development/rally-software https://www.atlassian.com/software/jira Other products such as Microsoft Project provide the ability to create schedules. There may also be a basic baseline function including high level start dates, finish dates, duration, costs, and work or labour estimates. Some schedules and graphing is provided, but this is usually very rudimentary in content and does not print in a consumable fashion.

The existing software tools lack a formal report collation with suitable analytics, automation and built in communication. The technical problem arises that such databases may be very large with complicated data structures that become unwieldly and difficult to manage or troubleshoot issues. What is needed are improved tools for analysing and validating such databases, leveraging hierarchical relationships between data structures and relationships as the data evolves over time, identifying anomalies, and repairing the data.

SUMMARY

An object of the disclosure provides a software tool that takes snapshots of the database at different time periods forming baseline data. Within the data in the database, a hierarchical relationship exists with links and dependencies between entities within a level and between levels, as well as temporally. A high-performance cache is preferably used for further processing of the baseline data. The baseline data is mapped into data objects and links are formed between the objects based on dependencies identified in fields of the data. The data is analysed by validating the data objects according to predefined rules to identify issues or anomalies in the database leveraging knowledge of those links and dependencies. The tool may automatically repair the database to resolve the issues or user selectable controls generated and displayed which when selected by the user automatically repair the database by modifying the data structures in the database. In an aspect, the present disclosure relates to a computer-implemented method for processing project plan datasets provided by a project management module, the method comprising:

receiving user input indicative of a first dataset of baseline data for a first period of time and a second dataset of baseline data for a second period of time from the project management module; importing the first dataset of baseline data and the second dataset of baseline data; mapping the first and second datasets of baseline data into data objects representing work task entities of the project plans;

based on fields in the datasets, identifying dependencies between individual work task entities of the project plans and create links in the data objects to other data objects representing those dependencies;

analysing, in an analytics engine, the first and second datasets to perform a range of validation checks for anomalies and issues that contravene predefined rules; and output to the user a report of anomalies and issues, and automatically repair the anomalies and issues in the master database or generate user selectable controls to be presented to the user, which upon selection by the user cause the anomalies and issues in the master database to be repaired. Additionally or alternatively the analysis may be used to track progress and/or allocations of work task entities and produce at least one report containing actionable information output to a user.

In another aspect, the present disclosure relates to a computer program and/or to a non-transitory computer readable medium having stored thereon software instructions that, when executed by a processor, cause the processor to process project plan datasets provided by a project management module, by executing the method described above.

In yet another aspect, the present disclosure relates to a system for processing project plan datasets, the system comprising:

a project management module that generates project plan datasets;

a memory; and a processor circuit in communication with the memory and configured to:

perform processing associated receiving user input indicative of a first dataset of baseline data for a first period of time and a second dataset of baseline data for a second period of time from the project management module;

importing into the memory the first dataset of baseline data and the second dataset of baseline data; mapping the first and second datasets of baseline data into data objects representing work task entities of the project plans;

based on fields the dataset, identifying dependencies between individual work task entities of the project plans and create links in the data objects to other data objects representing those dependencies;

analysing, in an analytics engine, the first and second datasets to track progress and/or allocations of work task entities and produce at least one report containing actionable information output to a user.

Another aspect relates to creating with a software tool a library of baseline data exported periodically or in response to events from the master data store of a project management module; selecting at least one baseline dataset from the library; performing analysis on the dataset to progress or projected progress of the project plan; and generating at least one report for communicating to a user.

The work task entities may be one or any combination of tasks, user stories, features, and epics. In general, these are any level of work used by the project management module to break down the project into ever finer levels of work, where work task entitles at a lower level may be grouped in forming an entity at a higher level, i.e. a hierarchical relationship exists with links and dependencies between entities within a level and between levels, as well as temporally. Thus, complicated data structures exist, which in known systems are prone to developing inconsistencies and other errors in how the entities relate to each other which are difficult to identify. The preferred embodiments take datasets from the project management module, e.g. snapshots of the data, at periodic points in time, ingests the data and maps it to internal data objects which allow the analytics engine to efficiently perform a range of validation checks for anomalies and other issues that contravene Agile rules. Thus, the user may receive a report quickly identifying any issues and allowing the user to selectively fix the source data (described below in relation to FIGS. 2C and 2F).

Furthermore, the snapshots of data allow comparisons to be made between two or more periods of time, allowing analysis to be performed by the analytical engine to generate reports showing movements in work task entities between periods by tracking those entities between datasets, which would be impossible with known solutions. More than two baselines could be consumed for longer-term analytics and trending. Or, the output from the analytics from a plethora of baseline pairs could be consumed by the analytics engine for longer-term trending and reporting (described below in relation to FIG. 2G).

Note: baseline may be updated by the user to generate a "Scenario Baseline" which is used to estimate the future performance using the longer-term trending and allow the user to "accept" changes to the project baseline in the project management module based on the estimation (described below in relation to FIGS. 2H and 2I). Once the analysis is complete, all or part of the scenario baseline data can then be pushed to the master. Ref: "Scenario Planning" diagram. This is a form of simulation.

It will be appreciated that the preferred embodiments have been described in terms in common usage in relation to current project management software tools and methodologies, i.e. terms such as Project Release, Program Increment, Iteration, Team, Epic, Feature, Story, Task, etc., but that these terms may change and/or other tools and methodologies may have slightly different terms for the same concepts, and that where such terms appear in the present disclosure and claims they should be read as encompassing those similar/equivalent features.

It will be appreciated that any features expressed herein as being provided "in one example" or "in an embodiment" or as being "preferable" may be provided in combination with any one or more other such features together with any one or more of the aspects of the present disclosure.

BRIEF DESCRIPTION OF DRAWINGS

Embodiments of the present disclosure will now be described by way of example with reference to the accompanying drawings, in which:

FIGS. 1A to 1C show an example of typical screenshots for an Agile project management tool;

FIGS. 3 to 14 show various output reports produced by embodiments of the disclosure; and FIGS. 15, 16, and 17A and 17B show various views of the User Interface provided by the software of embodiments of the disclosure.

DETAILED DESCRIPTION

The disclosure relates to a Software Application. It processes raw data exported from existing Agile project management tools or other project management tools. The software application is described herein with reference to the "Rally" tool, but as will be explained below, the preferred embodiments are made scalable/configurable so as to be usable with many different tools.

FIGS. 1A to 1C show an example of functionality and outputs of a typical Agile project management tool, showing respectively:

1) An example of a planning board view.
2) A simple backlog list showing the hierarchy of work task entities, i.e. Features and Epics, and importantly the simplistic high-level Dependency listing Rally provides detailing the number of dependencies but not the references.
3) The Dependency view for a Feature based on a very simplistic overview of Rally. The Dependencies are a tab within the broader properties of a Feature.

It will be appreciated that other Team to Team level dependencies may occur where a Feature, owned by Team A may have 4 User Stories, 2 of which they own and the other two are owned by two other teams. Dependencies add risk to a plan being achieved (i.e. the predictability).

These tools provide tabulated "export" functionality that can be typically opened in Microsoft Excel, (or extracted directly from their database via an Excel plugin, or more directly via a published API). The two tools referenced in the previous section are web based front ends to significant cloud-based databases. These front ends provide simple forms and graphics for users to enter data, update data and present data from the database.

Figure 2A:
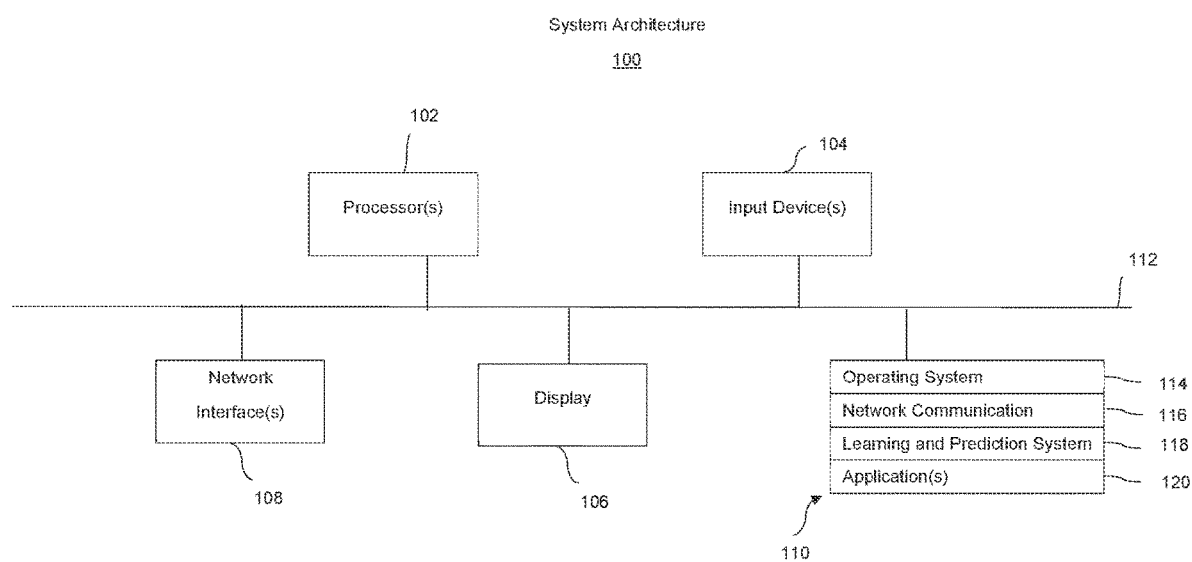
FIG. 2A shows an example of a system architecture for an embodiment of the present disclosure and FIGS. 2B and 2C show more detailed architectures.

FIG. 2A shows an overall view of the system architecture in which the software may implement the features and processes described herein. The architecture 100 may be implemented on any electronic device that runs software applications derived from compiled instructions, including without limitation personal computers, servers, smart phones, cloud devices, etc. In some implementations, the architecture 100 may include one or more processors 102, one or more input devices 104, one or more display devices 106, one or more network interfaces 108, and one or more computer-readable mediums 110. Each of these components may be coupled by bus 112.

Figure 2B:
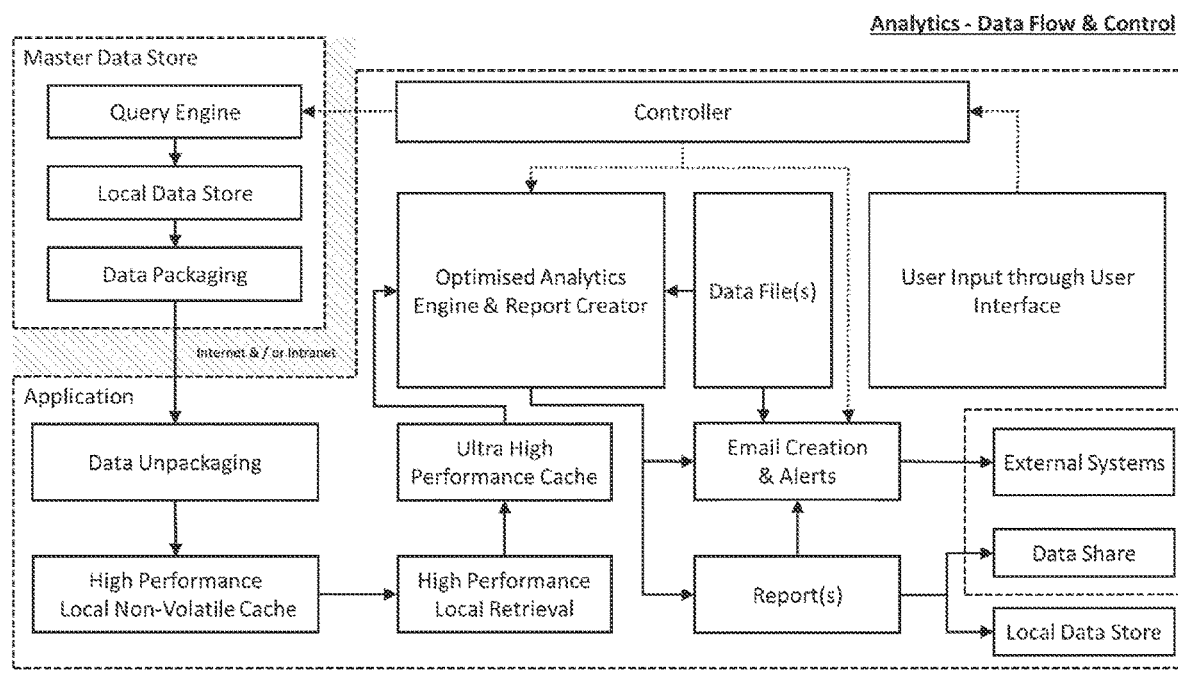
Figure 2C:
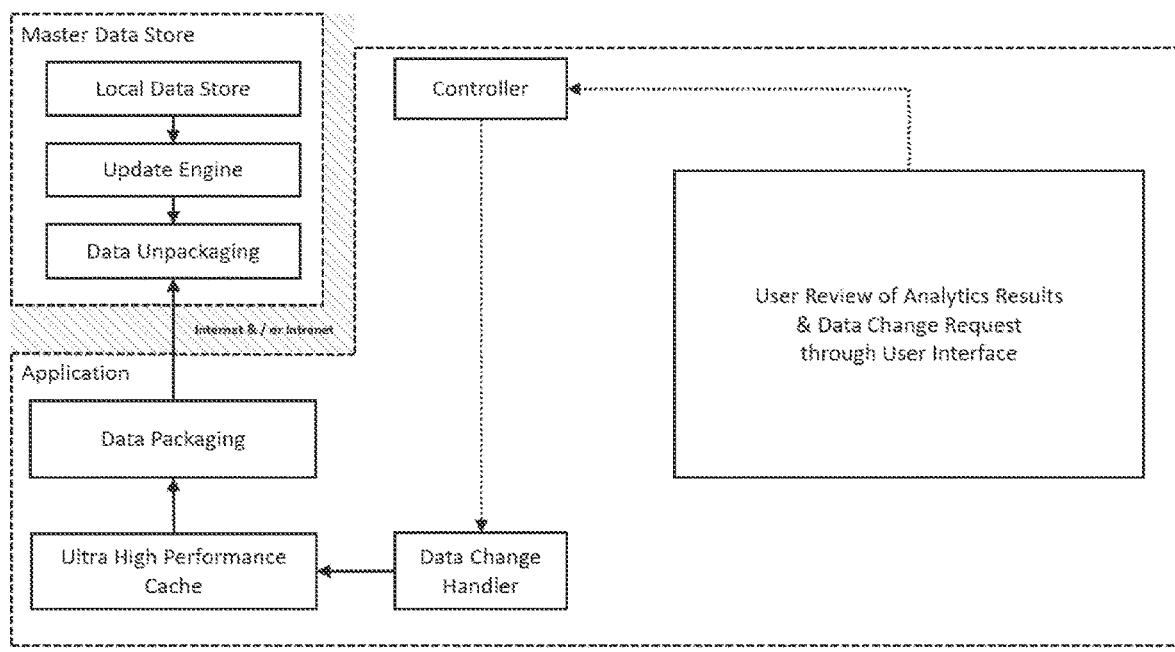

FIG. 2B shows in more detail an embodiment of the architecture including modules for analysis of data exported from the project management tool, and FIG. 2C shows an embodiment the architecture for updating the project management data based on the results of the analysis and user input as to required changes. Examples may include:
1) Moving work task entities to resolve dependency issues highlighted.
2) Reallocating work from one Team to another because of delivery performance.
3) Inclusion of a new Team to assist with throughput and then transfer of work task entities to that team.
4) Allocation of unassigned work task entities, for example to a Value Stream, Release Train, Project Release or Team.

FIGS. 2D to 2I show flow diagrams for the operations of the tool.

Baseline Export from Agile Application and Import/Ingest by Embodiments

The tool works on "Baseline" data that is stored by the user, e.g., an export from the Agile tool each evening (i.e. a time-based local database/snapshot). These may be exported from a master data store and stored in a high-performance local cache (FIG. 2B). The tool allows any two datasets to be analysed (or a dataset with itself, useful in certain scenarios). This unlocks more powerful analytics. Analysis across multiple datasets is possible.

The data described here in the baselines relates to Agile Features however the principles equally apply to other artefacts whose properties change over time. Examples of Agile Planning artefacts include Epics, User Stories, Tasks. These may be in combination.

The source databases only provide a view on the 'instantaneous temporal state' of the data. (Change history data for audit trail purposes is captured in Rally in a list.) Whilst the data provides the user with knowledge of the 'latest status' it does not provide a context of how this compares with the data at previous points in time. This is critically important since 'drifting' of activities/deliverables that were "Committed" at planning time can happen without visibility. Elements can come into scope, move out of scope, move in time with no real transparency. This can result in a loss of control.

The current solution by users is to add free text to Features in the Feature's Tag, denoting the commitment state. This information persists and the live data is exported and manipulated. This is time consuming and error prone. The free text can be amended by any user and thus the truth can be manipulated. The process is so time consuming and specialist that the process is often only run in limited areas, e.g., for the Release Train, and not in other areas that then help identify areas requiring attention. Such areas are Value Streams, Projects, Teams or other filterable subsets (e.g., through filtering of Epics, or Tag data). Upon broadening the analytics there are rules that also need to be adhered to ensure consistency of the data. E.g., handling movements between Value Streams, Release Trains, Projects and Teams.

Thus whilst in theory it is possible to drive a manual process using tools such as Excel to help manage thousands of data elements in practice the process is ineffective, error prone, computationally expensive and the potential held within the data to create Actionable Information is not realised. Errors can lead to a loss of trust in the data, resulting in apathy. As a result, activities can run out of control creating waste. This waste can be in the medium of time, money, energy and physical resources such as raw materials (to name a few examples).

By their very nature currently available tools for development using an Agile framework have a centralised data store (master data store in FIG. 2B). This data store provides a single repository for collaboration across all involved (either specific individuals or teams). These databases can grow significantly in size over time. To provide the expected performance the host system's performance can be critical. Critical performance elements can include the non-volatile storage media, processor performance and volatile memory. In addition, infrastructure required for disaster recovery such as duplicate non-volatile stores on secondary remote systems increases elements such as cost and complexity for a service provider.

To create the described actionable information, temporal datasets are required. These are referred to as "baselines". Each baseline contains sufficient data to perform the required analytics and is an accurate representation of the source data at that moment in time. Thus, a baseline may be considered as a temporal snapshot of the data.

In the provision of baselines to the end-user there are two challenges for the service provider:
1) Database query performance and transport to the end-user
2) Persistent storage Requesting a query (e.g. via "Query Engine" in FIG. 2B) from the remote database with a matured content size takes many minutes and potentially 10s of minutes and can be impacted by many factors not under the control of the end-user, all of which makes such methods of working with the data impractical. Whilst in some use cases the very latest data will be required, most use cases can be satisfied from a recent baseline taken at a point of 'data stability' (e.g., after close of business the night before). Selecting an agreeable point in time where the data is accepted to be stable could reduce the number of snapshot requests since the users could select the pre-captured baseline instead of requesting their own. This reduces the peak and average loading throughout the entire system.

To improve performance for the end-user, the host system's performance and all transfer mediums (intranet, internet etc) require attention. Given that the solution is likely to incur performance optimisation for peak demand rather than the average demand, this can become prohibitive.

Thus, scheduled queries, automatically saving the baseline data are considered. The frequency/timing can be defined by the user (via user interface and controller in FIG. 2B), together with the location of the resultant baseline. Thus a 'customer baseline library' may be created for near instantaneous access in, for example, high performance local non-volatile cache in FIG. 2B. These can be selected and moved to a high-performance cache for further processing.

In addition to scheduled queries, additional end-user based baselines may be triggered and saved in the library.

Additionally or alternatively to periodic baseline generation, baselines may be triggered via an event model where notable changes (as defined by rules on the server side) either trigger the baseline or through a subscriber model the Application is informed and triggers the baseline. These rules may be created and thus originate from the analytics application itself.

These data snapshots, resulting in stored baselines, could be constructed as a library. The control (saving, access, purging) of storage could reside within a local application or within a centralised application. I.e., the host system or local system may be the orchestrator of the process.

Storage could be on the host system or outside of the host system (another cloud solution, local server, end-user's system etc). It could also be arranged where the remote system's storage space is used as a distributed extension of the central non-volatile store. For example, the Software as a Service provider could maintain creation of the baselines and the library index without hosting the store of the referenced artefacts. Depending upon the location of remote storage, e.g., across boundaries of ownership, the data may be stored encrypted. In addition to the customer baseline library, a local (e.g., end-user) store can be held, with the ability to transfer data between them.

Additional comments, descriptors, type, end-user ID, date/time, area of data queried etc could all be associated with the stored baselines held within the library, or locally, to aid navigation, searching, filtering, purging etc.

Compression and/or reconstruction techniques may be used to minimise the size of the persistent store and improve transfer performance, i.e., see "Data unpacking"/"Data unpacking" modules in FIG. 2B, and in FIG. 2C where these operate in reverse.

As an alternative to saving a unique baseline entity, a virtual baseline could also be derived. Virtual baselines could be extracted from saved change-log information. An example of a change-log could be the change history saved with a specific work task entity (e.g., a Feature).

Whilst it is expected that such reconstruction would be processor intensive and incur a significant time penalty it could be used as a means of constructing missing baselines, e.g., interpolating between two existing baselines. Given that two input datasets can be used to perform an initial difference analysis, this is expected to be far more proficient than constructing a baseline for a specific data/time using only one (e.g., the latest) data.

The baselines are the source data for the application, from which actionable information is created. The actionable information is packaged into reports. The list of reports created are described in detail in the next section. Other reports may include more long-term statistical analysis of performance, prediction of future performance, scenario planning, capacity/demand analysis of resources (people or facilities) and exporting to other existing tools such as Microsoft Project, PowerPoint and Word.

Baseline Management and Selection

Existing tools can provide a huge flexibility in filtering of the underlying datasets. Whilst 'views' can be stored and shared it is common that people have their own special methods and techniques that results in inconsistency in reports to management and the leadership team. Without standardisation, inconsistencies reveal flaws in the perceived accuracy of the data presented. Loss of confidence in the data erodes confidence and fact-based decisions are exchanged for subjective ones. In the preferred embodiments, the underlying analytics cannot be fundamentally changed, they are compiled and obfuscated. Selection, filtering and report sheet selection is provided through templates to ensure consistency. These templates store the report configuration data (which report sheets should be included and their order), as well as human-readable scripting language-based strings for data selection and filtering, and some other configuration options. These Report Templates (and Batch Processing Templates described later) may also be stored in a centrally accessible library, or stored locally in one or more identifiable files that can be shared. Sharing may necessitate version control.

Through configurable files, batches of reports may be automated with automatic email, SMS or other electronic communication creation (via "email creation and alerts" module and "external systems" in FIG. 2B). This is implemented as batch processing Project Releases. As well as "all projects", individual projects can be included in the automation process (a separate report for each). Features without a Project Release can also be included in their own report. Email definition includes the distribution, content and the addition of reports (the type is selectable). Reports are also stored/archived on data storage drives (e.g., locally or a network drive) based on the configuration file ("local data store" and "data share" in FIG. 2B). Selection of the batch configuration file is (optionally) linked to the report template file to automate as much as possible for the user.

Batch processing may be extended beyond Project Releases to batch processing Report Templates; combining Project Releases and Report Templates; or a selection of available configuration options.

The application also contains its own user definable calendar. This allows the user to define the relationship between Program Increments, the child Iterations and the date. This data is used to indicate lateness of deliverables, incorrect assignments in the originating tool of Iterations to Program Increments, incorrect Program Increments and selection of the current PI for the analytics. Other temporal data such as Team capacity may be included in the calendar or an associated data store, local and/or centralised. This data may be amended by the user as part of a scenario planning process.

The essence of the output is to provide "Actionable Information" to stay in control in an effective and efficient manner. The extensive automation has resulted in reports that could take hours, days and weeks to create instead taking just a few minutes, or less. With all the consistency and elimination of human error and waste that automation provides. Underpinning this are the baseline datasets and the application of business rules.

In addition to the provision of a library for managing baselines, the application provides analytics which would be too consuming for a user to undertake. By the time extensive manual processes consuming thousands of operations were completed, the result would be outdated.

Analysis and Reporting

There are numerous (over 40) report sheets with two different types of report. The number and types will grow over time. The first type is the "Team Report" which is an Excel document. The second is the "Executive Report" which is primarily a PDF version of the Team Report however because Executives don't need the same detail as the Teams some of the data is omitted (i.e. the higher-level summary retained without the underlying decomposition). The Executive Report automatically minimises certain groupings (and modifies the included key) to optimise the data for the audience. The Executive Report is saved in PDF format to increase viewer compatibility for the busy executive on different viewing platforms (phone, tablet, laptop etc). To provide an example illustration of a Feature work task entity, the tracked items, "Features", are shown grouped in their Parent "Epic". However, the grouping required depends on the audience. Some will want to see these grouped by Team, some by Project Release. This may be extended further (e.g., Value Streams or based on data within the Features such as Feature Tag values). Options are provided in the form of separate report sheet instances (all derivations are not listed below). Using Features as the work task entity as an example, the Report Sheet types are summarised as:

About—this includes a reference to the loaded baseline files, decoded ASL filter; selection of Value Streams, Release Trains, Project Releases and Teams; contents.

Warnings—indicates where specific business rules have been broken, examples include: an invalid PI or Iteration or combination of; missing dependency predecessor.

PI Plan—a limited time span 'schedule' of Features. This is based on the "Current Baseline". Where a Planned Iteration is not identified it is placed in a dedicated column. The PI is automatically selected for this and the other "PI . . . " Report Sheets but the user can manually change it based on the PIs extracted and validated from the dataset. Schedules also include notification of movements of Features (i.e. to the right or left in a time-line calculated using the previous and current baselines); links to the relevant Time-Shift sheet (if selected) and coloured arrows indicating Dependencies between the Features (the colour and style indicating that certain business rules have been triggered, e.g., the flow is backwards, or the state of the predecessor Feature is incorrect). The relevant data cross-correlates with the specific Report Sheets (i.e. Time-Shift and Dependencies). Tooltips are provided to highlight some additional data such as the reason and impact of the time-shift movement.

PI µPlan—Similar to the full PI Plan but providing a condensed format (e.g., only the Feature ID & Epic ID without the dependency arrows or the space between Iterations to accommodate them.) Options will be included to allow the full versions to become largely equivalent with the PI µPlan, in varying steps of granularity. Some configuration of the PI µPlan Report Sheet (e.g., Smart State and Smart Heat Map) is included. Inclusion as a Report Sheet allows both µ and full variants to be included in the same report. Time-Shift calculation, display, tooltips and hyperlinking to the closest matching Time-Shift Report Sheet is all retained. Grouping by other one or more other parameters, e.g., Feature State and Time-Shift magnitude, allows for a grouped "stack chart" to be created.

PI Scope Delta—a high level management summary of what has come in and gone out of the PI, these sections decomposing into a total of 6 lower sections. Tooltips style Excel "notes" are used to highlight some additional data such as the changes in the displayed current (baseline) data with the previous (baseline) data. This uses the "Previous Baseline" and the "Current Baseline".

PI Time-Shift—a list of all Features that have moved relating to the PI (in, out and within), with supporting data such that the management/leadership team can take supportive action. Temporal direction is indicated with colour. Missing or invalid data is indicated with colour.

PI Dependencies—a list of the Features in the PI that break business rules (based on state, flow or timing). The rule broken is indicated.

PI All Dependencies—a list of all dependencies in the PI with the above business rule indications still applied (i.e. to those applicable).

PI New Scope—a list of the new Features added into the Backlog of the PI. States are included with highlights where action or discussion may be required (e.g., accepted and committed states).

PI Metrics—a full breakdown of the Committed Features, Deliveries and Current Plan for the PI. When one of the Features Committed in the Previous Baseline is delivered in the Current Baseline the Analytics Engine calculates the difference in Iterations between the Iteration in which it was Committed in the Previous Baseline and the Iteration in which it was Accepted in the Current Baseline. This provides an indication of Feature Predictability at the level of Iterations for those committed in the original plan. (Opposed to Feature Predictability at the PI level as indicated by the % shown in the title of the graph.) All positive values are added and reported as the "Delivered Feature Slip". PI Metrics are either grouped by Project Release and then Team or just by Team. The importance of measuring the "Delivered Feature Slip" is driving teams to be predictable at an Iteration level. If teams are not holding to their commitment then dependencies between Features can create a toppling domino effect.

PI Project Release Graphs—shows a Feature delivery burn-up against the original committed plan plus the commitment and delivery of additional scope and the Delivered Feature Slip (cumulative positive values only). A novel feature of the present technology is that the graph distinguishes new scope (both commitments and deliveries) from the original plan. Together with the novel feature of Delivered Feature Slip, these require the temporal datasets. Available for all projects or individual (in single report and batch processing). This graph offers both PI and Iteration level predictability for the completion of Features. This may additionally extend into User Stories (the children of Features) or extend upwards to the Feature's parent Epic. There are further parents and children too potentially in scope. Inclusion of children and/or demand estimates for the remaining work will further allow estimates for the outstanding work to be derived and presented in the tabulated metrics and graphically. In preferred embodiments, the software gets the data by direct automated database mining to collate the required baseline data. The graph may be the aggregation of all selected project releases or individual project releases (including one for Features without a project release defined). It is worthy of note that the aggregation reflects all the selected and filtered data. For example, selection of a Release Train, or an integration activity through filtering of Tags, will produce a report, and thus graph, for just that scope—i.e., the Release or integration activity's performance.

PI Teams % Delivered Graph—a graph showing the % delivery for each team (against the original plan) plus the overall %.

PI Teams Delivered Feature Slip—a graph showing the Delivered Feature Slip for each team plus the overall. I.e., Iteration predictability per team and overall.

PI Teams Features Graph—a graph showing the team's performance. Original plan, current plan, new scope committed and new scope delivered as above in PI Project Release Graphs, but broken down per team. I.e., PI predictability per team and overall.

The following are similar to those above, but not restricted to the PI, i.e., covering the entire backlog selected/ filtered without the PI time boundary.

a. Roadmap—an unlimited time span 'schedule'. Covers all Program Increments. Any Features not allocated to a Program Increment are allocated a dedicated column.

b. μRoadmap—analogous to the PI μPlan.
c. Time-Shift
d. Dependencies
e. All Dependencies
f. New Scope Current Baseline—inclusion of the raw "Current Baseline" dataset loaded (selected by the user).

Previous Baseline—inclusion of the raw "Previous Baseline" dataset loaded (selected by the user).

Other possible plans include:

Score Cards (PI & Roadmap)—with selection this can be at the Value Stream, Release Train, Project Release & Team level. Filtering allows further refinement, e.g., specific Epics, Epics owned by specific individuals. The Report Sheet will contain a 'summary' which is likely to be a series of quantified traffic lights for key performance and backlog housekeeping data (this novel feature is unknown in other tools such as Rally). Where traffic lights are deployed, the thresholds will be configurable. The parameters reported against will be selectable, either through the options or through differentiating the Report Template.

DETAILED EXAMPLES

An example partial dataset is shown below. In practice this may be thousands of rows and tens of columns wide. The column headings may vary between exported tools, with the example below purely an example, configuration has been designed in (only required at setup).

| Feature ID | Feature Title | Program Increment | Iteration | Project Release | Epic ID |
|---|---|---|---|---|---|
| F1005 | Cup Filling Mechanism | PI 25 | 01 | Snowdon | E101 |
| F1006 | Cup Filling Controller | PI 25 | 03 | Ben Nevis | E101 |
| F1007 | Conveyor Torque Control | PI 25 | IP | Snowdon | E103 |
| F1008 | Database Restore Mechanism | PI 26 | 05 | Ben Nevis | E104 |
| F1008 | Mobile App Login | PI 30 | | Ben Nevis | E201 |

Figure 3:
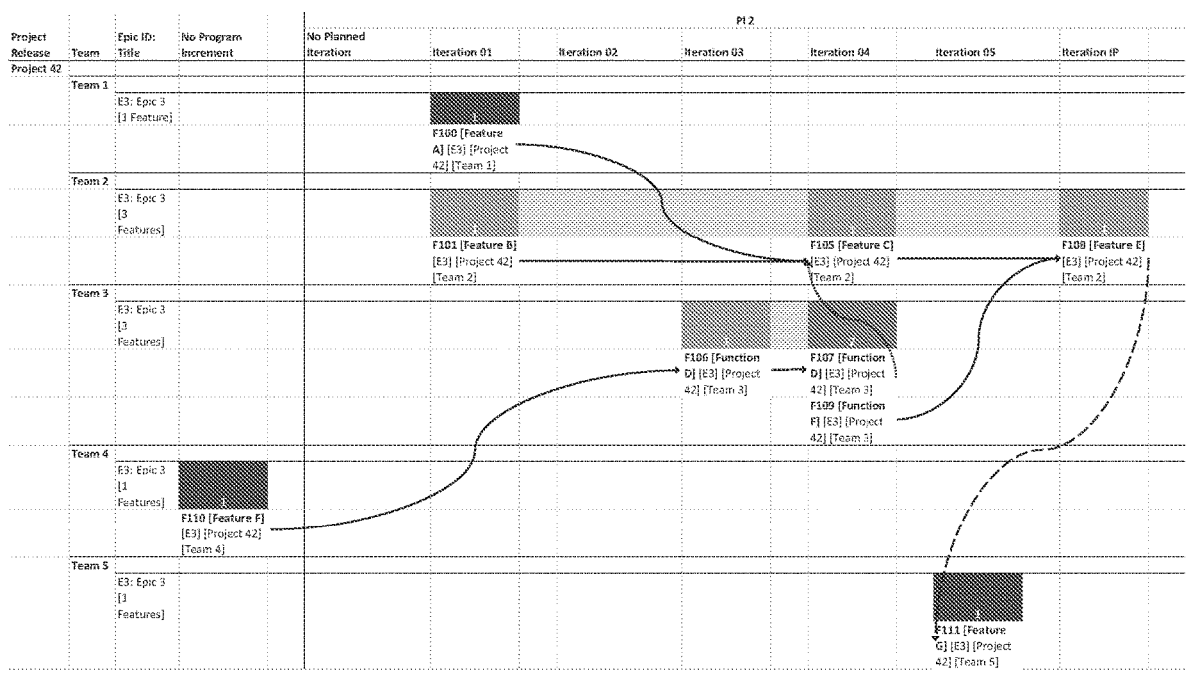

A Roadmap example is shown by FIG. 3. This is similar to a PI Plan, with the inclusion of multiple PI's (one shown) and a column for Features without a PI defined ("No Program Increment"). Features have coloured indication (not shown) to indicate their state, or other user defined properties. Within an Epic the number of features are summed in a row above, with a numeric value and shading indicating the areas of higher delivery—a "heat map" drawing the reader's eye into the highest concentration of Feature deliveries for that Epic. Between these numbers a continuation is included to indicate the "span" of the Epic. Features that have moved in time compared with the original baseline contain tooltips containing actionable information and coloured hyperlinks to the Time-Sheet Report Sheet. The colour of the hyperlinks indicates the direction of movement from the baseline. Note: many of the highlighting colours used in this and other report sheets can be changed in a configuration file. Dependencies can be indicated in textual syntax and arrows. Arrows are included in this example. The arrows are colour coded/patterned to indicate the result of business rules such as state checks, forward flow and adherence to lag. Lag is a property prescribed per Feature, if a lag is not prescribed then a default (user configurable) value is used. It allows the "gap" between Features to be defined. For instance, if Feature X was the design of a hardware component that after Feature acceptance required 4 Iterations to manufacture then it would have a lag value of 4. If its successor, Feature Y, was not greater than 4 Iterations from Feature X then a dependency rule would be triggered. If they were exactly 4 Iterations apart a different dependency rule would be triggered. Setting a lag value of 1 ensures a 'forward flow'.

F107 to F105 breaks this rule in the example below and triggers a dependency warning. F108 to F111 is a 'backward flow' which triggers a dependency error. A Feature state check is also run. Given the current defined states, a "Committed" Feature's predecessors must, unless completed or rejected, be in the "Committed" state. State checks also consider the accepted state/completed nature and rejected nature of successors and predecessors) and negate flow checks as appropriate.

The information presented is illustrative. For example, a textual description of the dependencies may be included with the shown Feature information. Embodiments may include further options to change/limit the displayed information for the Features or other elements. For example, simplifying the Feature content to only the Feature ID; removal of the dependency arrows. Accepted and Rejected Features may also be added (assuming they are not eliminated in the ASL filtering).

Another inclusion is a time-line marker. This is applicable to all time-based Report Sheets (e.g., PI Plans and Roadmaps and their derivations and PI Project Release Graphs).

Figure 4:
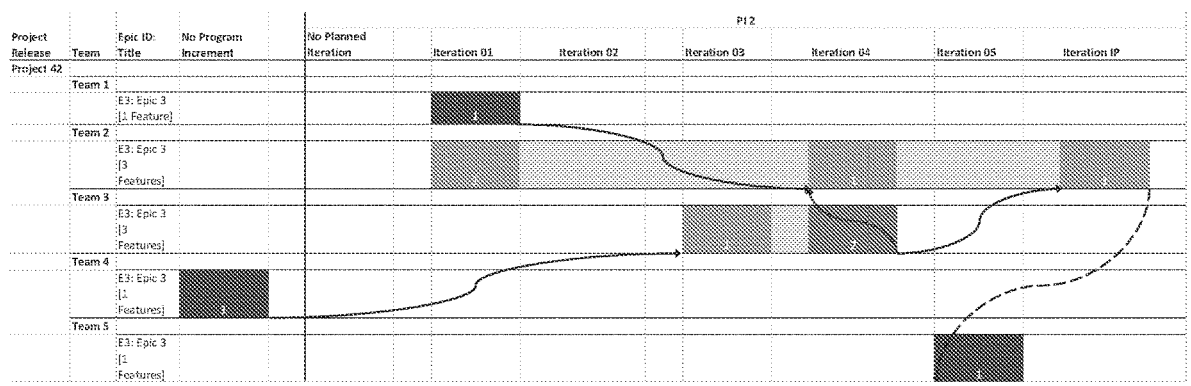

Grouping is used to "hide" details (i.e., the Features). It can be done by the user (employing normative Excel functionality). It is programmatically performed by the Application (and hiding of unwanted rows in the Key, not shown) prior to creating the PDF for the Executive Report. The result of such Feature abstraction can be seen contrasting FIG. 3 and FIG. 4, both contain the same underlying dataset.

Depending upon the report sheet type, different groupings are available. In the example shown by FIG. 3 & FIG. 4, the Features are grouped by Project Release, and then Team and then Epic. This allows the same base data to be structured in optimised ways for different stakeholders. This increases the consumption of data, minimising repeated communication and data sharing to gain understanding. Other groupings could exist, including Release Train and Value Stream for example.

FIG. 5 shows a PI Scope Delta example, which includes the Movement Reason and Impact for transparency. Bold font indicates changes compared to the previous, with tooltips providing contextual information. Overdue Features are highlighted by a solid border. FIG. 6 shows the information fully collapsed, and FIG. 7 shows the information partly collapsed.

All Project Releases Feature (Burn-Up Etc) Graph

The Delivered Feature Slip is included, plotted against the right-hand vertical axis. These graphs can also be included for each of the Project Releases as separate report sheets.

Figure 8:
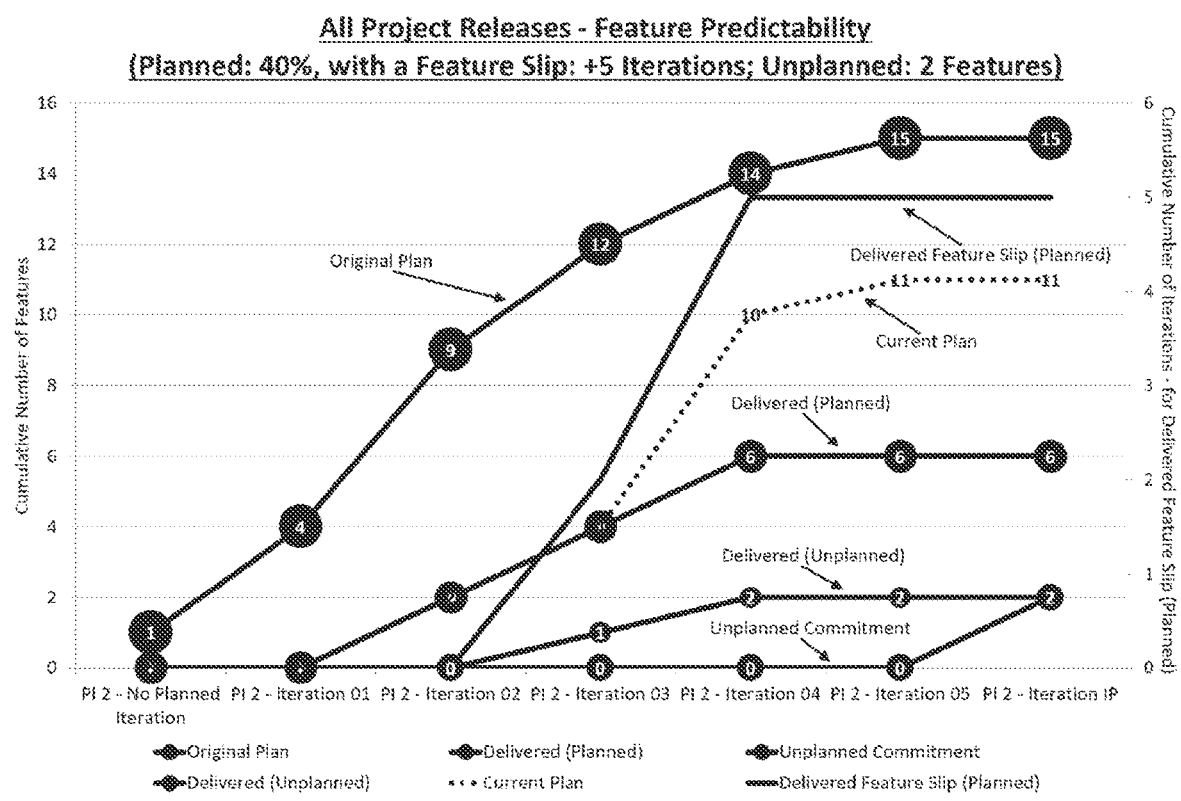

In the example shown by FIG. 8, metrics were run at the end of PI2—Iteration 04, the cumulative Delivered (Planned) line thus levelling off. There are three further plans here: 1) include a time indicator, as mentioned earlier; 2) use broken series lines to indicate 'the future'; 3) include a projection of completion "Delivered" (potentially both Planned and Unplanned) using historic data from previous baselines analysed and/or updated parameters and constraints from scenario planning. Based on the Report Template (specifying the criteria or scope of the report) historic data can be processed 'off-line' and data models created ready for fast on-line prediction. These may be raw numerical models allowing averages and trends to be extracted or more complex AI models to allow other factors (not limited to keywords) captured within the dataset (e.g., individual Team performance, and Movement Reasons & Movement Impact) to improve the forecasting. As time progresses, the models can be updated to improve their prediction/forecasting. To increase the accuracy and robustness other data may be included, examples include the categorisation of work, names of team members, experience and competency. Over time this may lead to an AI prediction of the optimal team makeup for forecasted scenarios (e.g., a Project Release containing certain categories or types of work). Input variables to such scenario planning may include "absolute speed" of delivery and "predictability" trade-offs. The current known factors impacting predictability are:

Team competency
Specific team members
Number of dependencies (and between whom)
Historic Feature time-shift/slip (+ve and −ve values)
Historic PI predictability
Unplanned work
Changes to the committed plan post planning
Capacity vs demand ratio
Seasonal impacts (e.g., holidays, sickness and tradeshows)
Performance of risk management This can be run at the portfolio planning level to aid scenario planning. Input criteria such as deadlines or weightings can be used to bias the calculations and thus the result.

An extract of an example PI Metrics Report Sheet may be seen in FIGS. 9,10,11,12,13 & 14, shown in a similar horizontal arrangement as a PI Plan but with the metrics broken down vertically and totalled in sections and a grand total. Performance is colour coded in a red-amber-green style (FIG. 9 showing red). Thresholds may be configurable.

In the example shown by FIG. 9 the grouping is by Project Release and then Team.

Another form exists without the Project Release upper grouping. Other groupings might include Release Train and Value Stream. The Project Releases are 'minimised', the underlying data explained in the following text.

As shown by FIG. 10, expanding the first listed Project Release, two further categories are exposed. Planned and Unplanned data is separated.

In the example shown by FIG. 11, the Planned category is expanded revealing the contribution of the teams associated with the original plan (in the previous baseline) for PR 1. Transfers between project releases or teams (in this two-tier example) are managed, the transfer ascertained comparing the previous and current baselines.

The example shown by FIG. 12 reveals a format akin to the PI Plan. From a metrics perspective the information is richer than a PI Plan since the PI Plan (& Roadmap) view is largely detailing the current plan (from the current baseline). However, the Metrics view clearly identifies the original commitment, what has been delivered and the current commitment against the original plan.

Original commitments that have moved are indicated. In this example red and underlined. The underline indicating a hyperlink to the Feature in a Time-Shift Report Sheet. Hovering over the text reveals summary information about the Feature and its movement (e.g., previous timing, movement reason and movement impact). Movements later & earlier are indicated in different, configurable, colours. These may be in plurality and have configurable thresholds. This builds a colour map of the Iteration Predictability which may also be provided as one or more specific report sheets.

In addition to the performance of delivery against the Original Commitment indicated by colours, as described, a number in square brackets is included. With the exception of No Planned Iteration, the number indicated is the number of iterations the feature was delivered late, or early. The calculation is different for Feature in No Planned Iteration (which have not been planned properly), biasing the team to ensure they plan properly. The example shows a Delivered Feature Slip of "+2". Earlier deliverables would result in a −ve number shown in the square brackets. However only positive numbers are accumulated into the Delivered Feature Slip. The objective is to minimise lateness which may impact successor Features. Including a −ve number would allow the metrics to be offset/manipulated by deliberately committing to features late and then delivering early, masking other late deliverables.

The example of FIG. 13 expands the unplanned category. In this example only Team 1 had committed/completed additional work in PR 1 after the original plan was committed to.

The example of FIG. 14 expands the above summary details for Team 1. The Features can be seen allocated to Iterations. Those completed are grouped as "Delivered". Those still committed are grouped as "Unplanned Commitment".

User Interface

Figure 15:
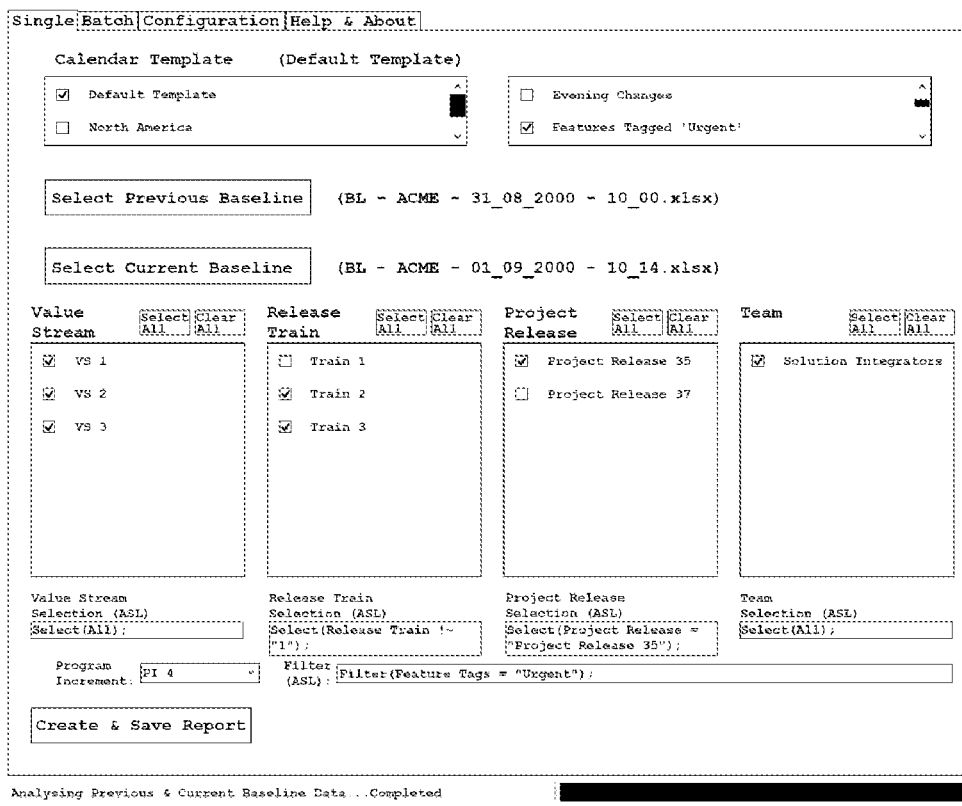

FIG. 15 shows a screenshot from the main user interface. The Default Calendar is loaded, the baselines are selected and the "Features Tagged 'Urgent'" Report Template is selected.

Human readable ASL (Advanced Scripting Language) has been developed to allow the user to define selection and filter criteria. Auto-completion is provided during user entry. This script expression is saved in the Report Template.

Figure 16:
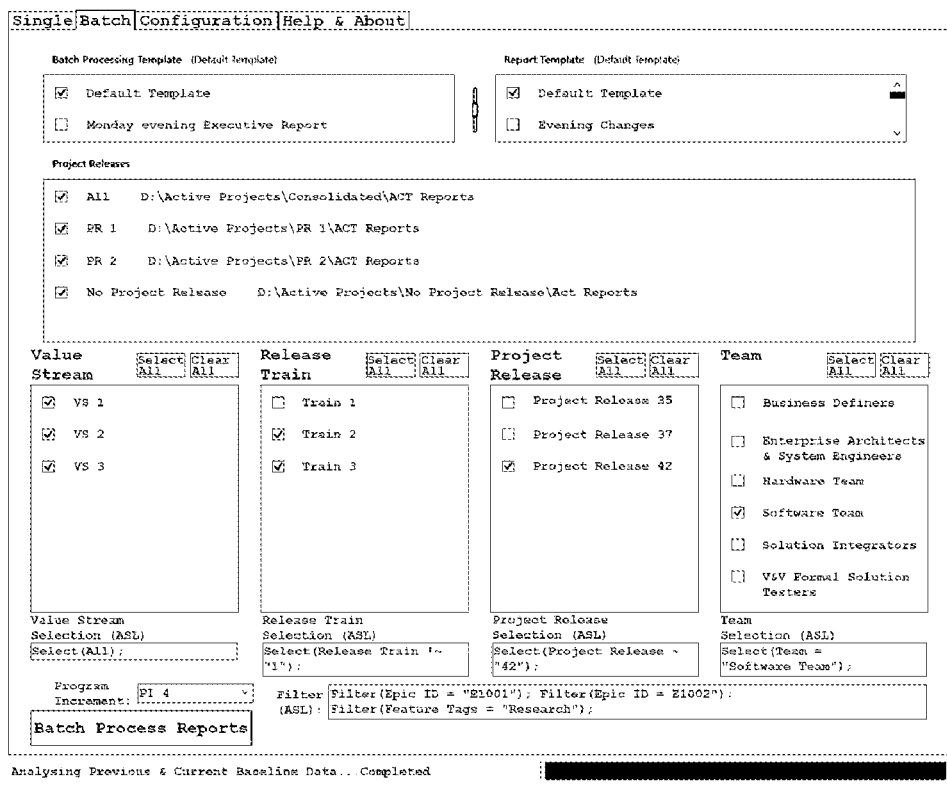

The example shown by FIG. 16 is the batch processing user interface. In this example the Report Template is the default selected upon Application start up. The matching Batch Processing Template has been linked and loaded automatically and the Project Releases with their archive location loaded. (Unlinking is provided by the link button between the two selections.)

The Selection and ASL (Advanced Scripting Language) text is colour coded (not shown in FIG. 16) to indicate the result of business logic rule checks. These include colours for: syntax completeness; valid values; string comparison with saved values; result comparison using the entered values and applying the Report Template values. This provides confirmation of the entry with the intent of the Report Template.

Figure 17A:
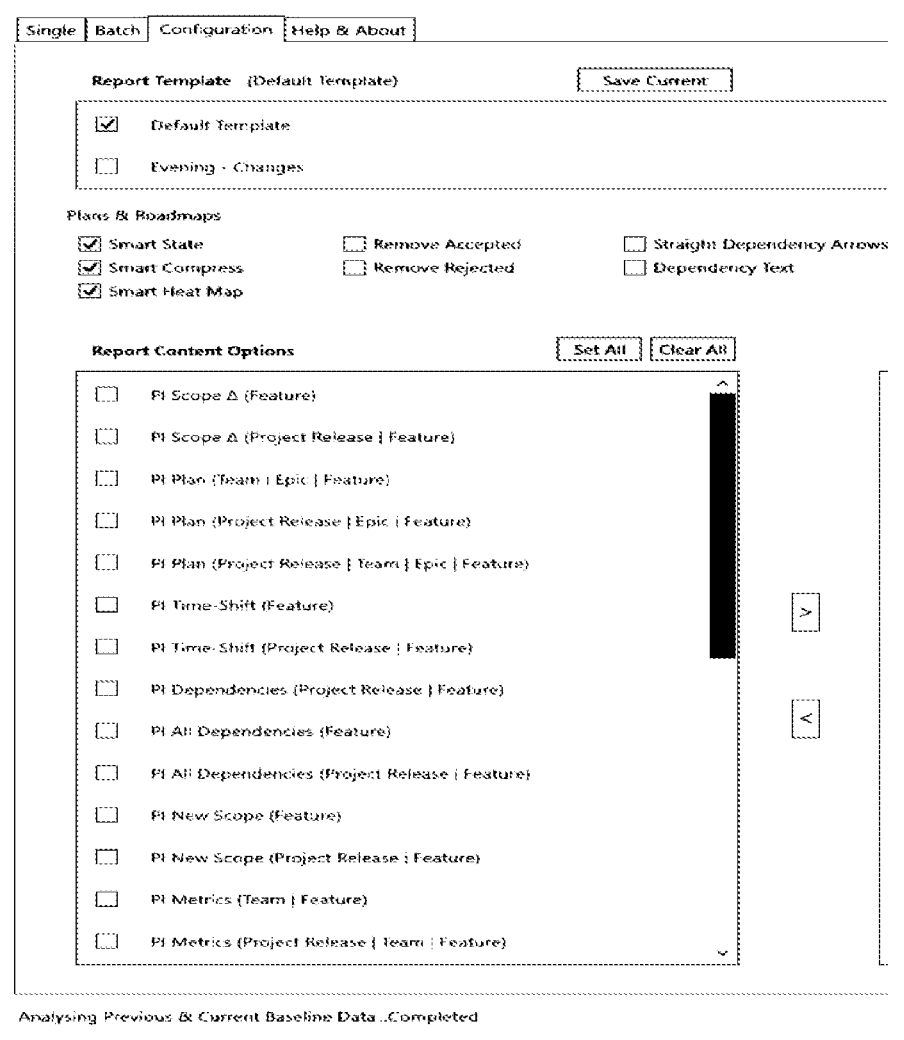
Figure 17B:
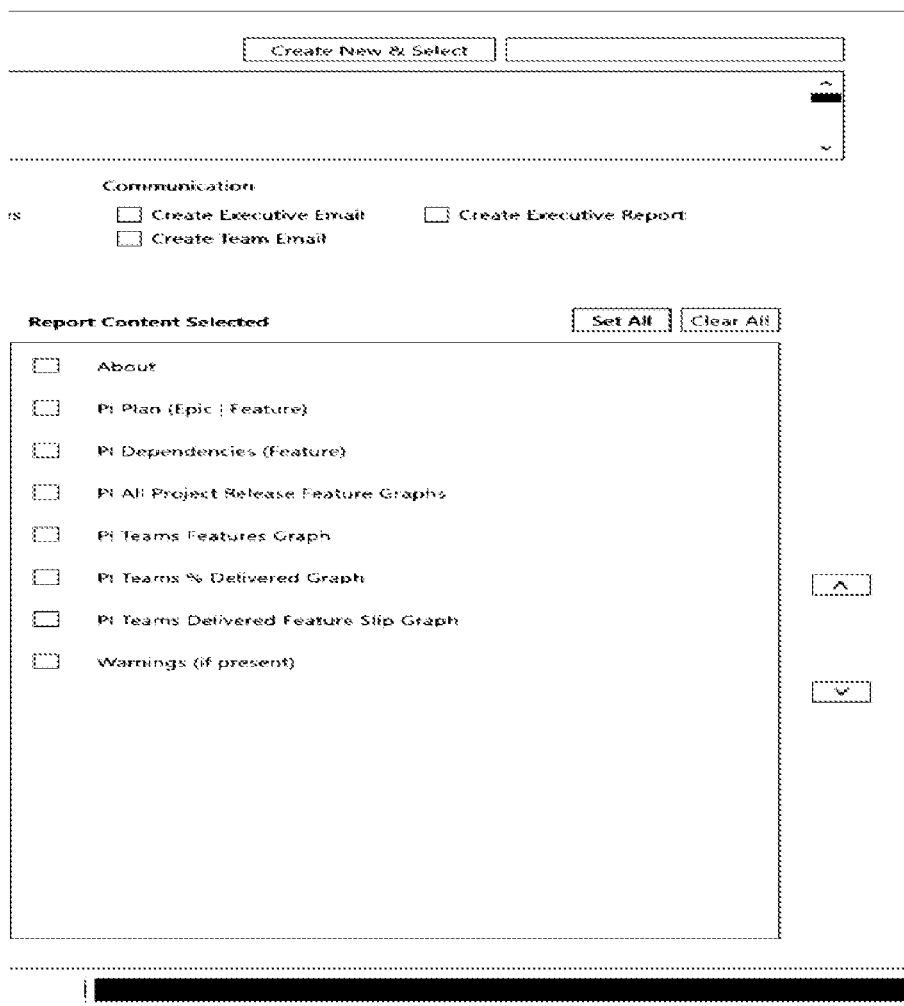

The example shown by FIGS. 17A and 17B is the configuration user interface. Report sheets can be added and removed and then re-ordered in the Report using the arrow buttons. Availability of Report Sheets, and other functions, is licenced. "Smart State" colours the Features according to the states in the schedules (states and colours are configurable). "Smart Compress" optimally packs the schedules to save paper/screen area. "Smart Heat Map" is the grey rollup with white numbering described earlier. The dependency arrows by default are curved but may be changed to straight (elimination is also possible). The dependency text is optional (this will expand to a broader selection of data to include).

The Communication section creates emails (simplified for single report, full content for batch processing as described earlier). Alternative means of communication, e.g., SMS, are possible. Executive and Team e-mails can be auto created. For example, the content may be automatically created based on keywords and tags. For example, inclusion of the current PI Predictability and the PI Teams Feature graph or other results from the analytics. The Excel report is always created and displayed following creation (the option of display is also possible). Selecting the "Creative Executive Report" creates the Executive Report (for the selected Report Sheets) which is shown upon completion. All reports are automatically saved with headers, footers, print settings, page rotations and the date/time embedded in the file name. Batch processed reports have an additional identifier in the name. A user defined Confidentiality (or other) strings (two off) can be added to the header of each Report Sheet.

Reports created may be added into a library associated with additional properties for easy user searching or automated selection. This may be local or centralised to minimise the creation of duplicate reports. This is in addition to the archiving feature in Batch processing that promotes broader communication, transparency and data/performance provenance.

Additional report output styles can also be created. Examples include Word and PowerPoint. An extension for end-user flexibility would thus include the use of their own templates with content automatically entered based on defined keywords or tags. This will also enrich the current email format. E.g., <<All Projects Graph>> could be used as the tag to denote the insertion point of the corresponding graph. The format (e.g., "Image" or "Raw") could also be included in the tag (e.g., <<All Projects Graph|Image>>) to specify the format. This could be extended with other metadata such as the size of the inserted report item and may include property: value pairs as the complexity grows (e.g., <<Object: All Projects Graph|Type: Image|Colour: B&W>>) As well as objects (such as graphs) results such as the PI Predictability or number of committed Features in a PI's Iteration could also be included. A dictionary of configurable tags could be provided either for copying/pasting from the application into the user's template or through integration/inclusion of the template in the Application and direct insertion. In such an integrated environment, if the analytics had already been run the user's template could then be immediately updated in a live-view style mode. This would help the user validate their selection, particularly useful to ensure the format of the template is correct (e.g., of image size selection).

Figure 2D:
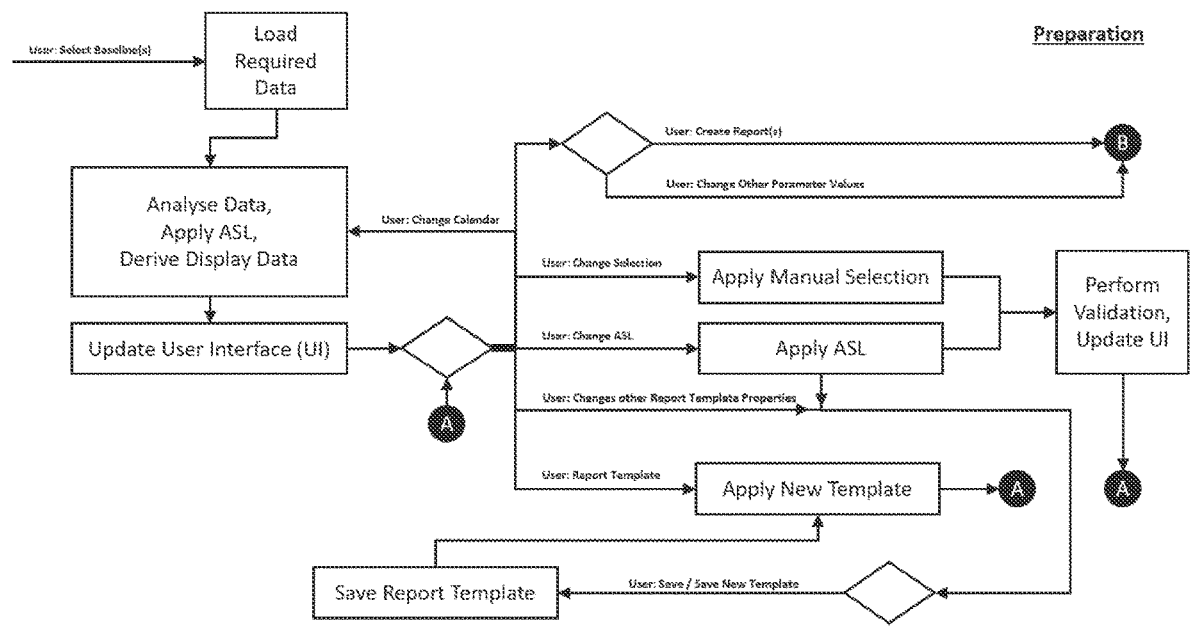
FIGS. 2D and 2E show an example of a flow diagram showing the steps of a method of importing and analysing datasets from an Agile project management tool according to an embodiment.
Figure 2E:
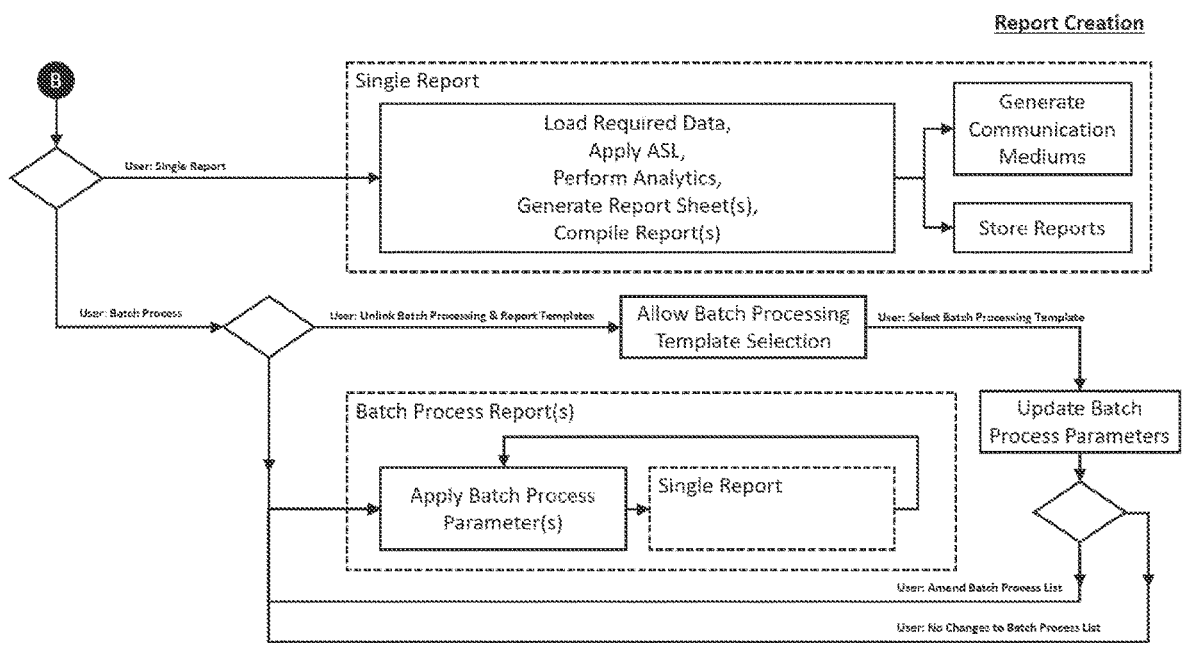

FIGS. 2D and 2E show the process of preparing data for analytics and report creation via the User Interfaces.

Trend Analysis

Figure 2F:
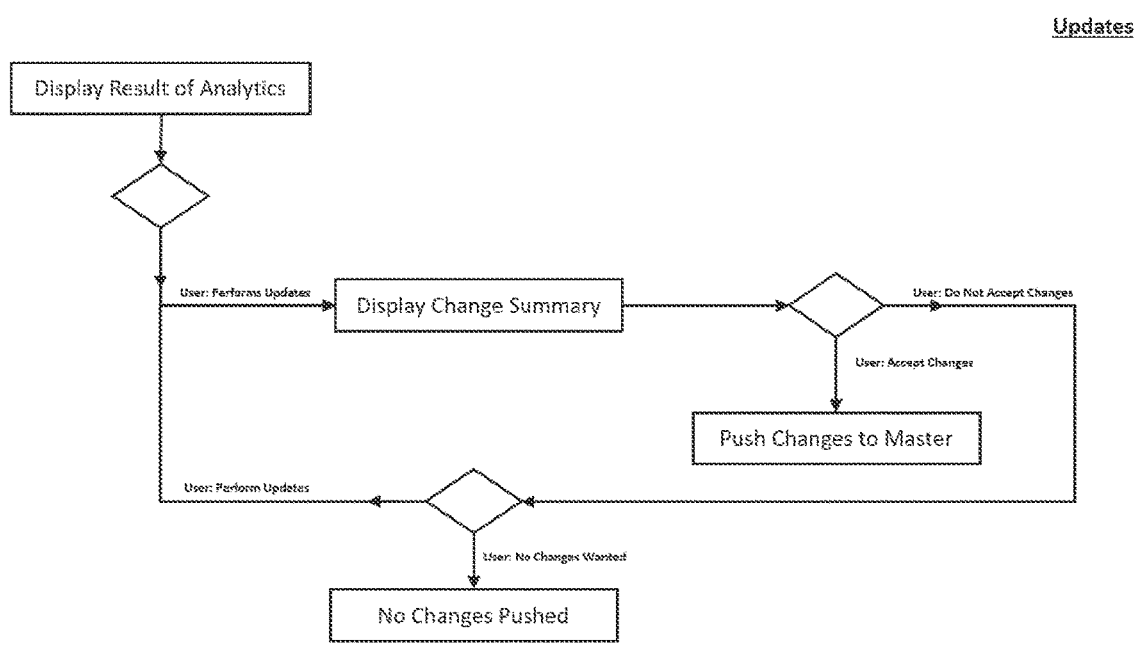
FIG. 2F shows an example of the user updating the Agile project management tool based on the results generated.
Figure 2G:
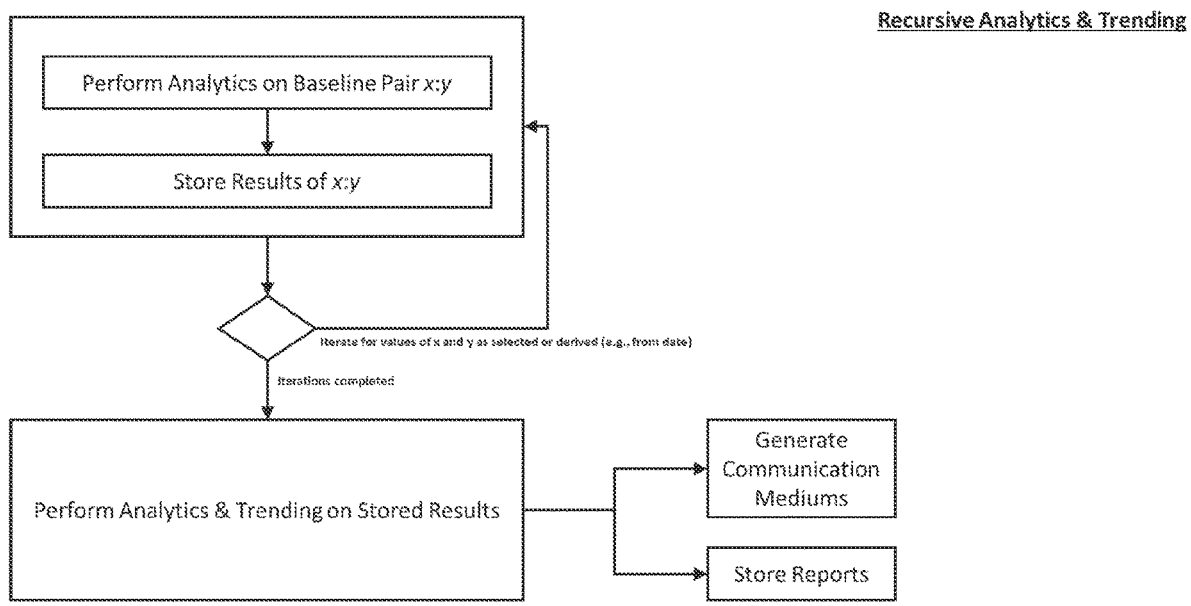
FIG. 2G shows an example of a flow diagram showing the steps of recursive analytics & trending according to an embodiment.

The snapshots of data allow comparisons to be made between two or more periods of time, allowing analysis to be performed by the analytical engine to generate reports showing movements in work task entities between periods by tracking those entities between datasets. More than two baselines could be consumed for longer-term analytics and trending. FIG. 2G shows a flow diagram for recursively selecting successive pairs of baseline data sets for analysis. The output from the analytics from a plethora of baseline pairs could be consumed by the analytics engine for longer-term trending and reporting which again gives rise to communicated or stored reports.

As in FIG. 2B, the recursive analytics may make use of the non-volatile storage for storing the data generated in the recursive analytics. This has the advantage of stored data which is available for future recursive sessions, speeding up performance.

Note: the baseline may be updated by the user to generate a "Scenario Baseline" which is used to estimate the future performance using the longer-term trending and allow the user to "accept" changes to the project baseline based on the analysis (described below in relation to FIGS. 2H and 2I).

Once the analysis is complete, all or part of the scenario baseline data can then be pushed to the master. Ref: "Scenario Planning" diagram. This is a form of simulation.

Data Change Handler

As described, the user may receive a report quickly identifying any issues. The tool then allows them to selectively fix the source data. FIG. 2F shows the process by which the controller and data change handler (FIG. 2C) pushes changes to the master database. Thus, the tool not only identifies issues in the data, but allows the user to update the project management software database with appropriate changes to fix the issues and/or revise the project plans.

Scenario Baseline Creation

Figure 2H:
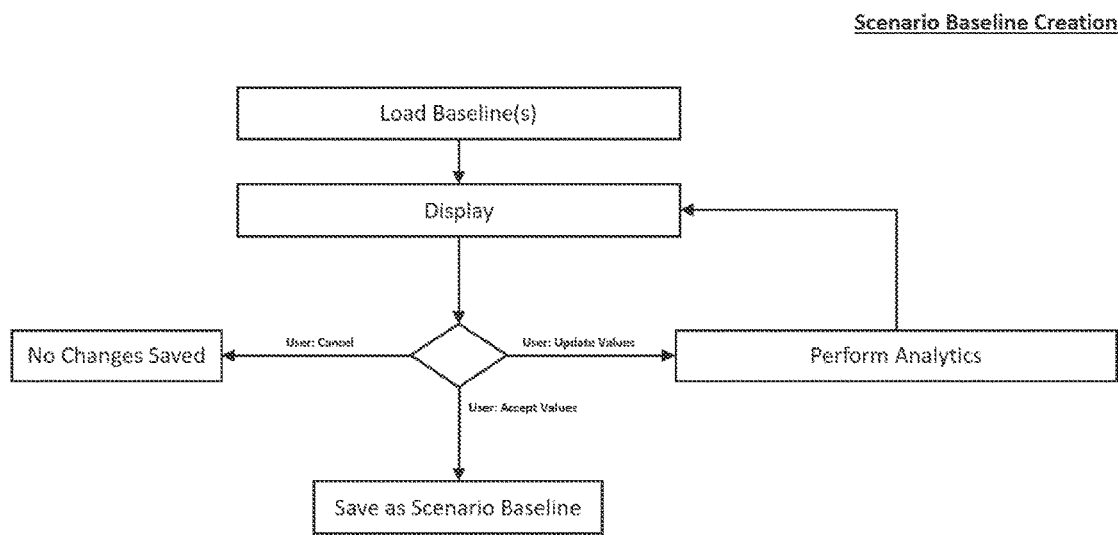
FIGS. 2H and 2I show an example of a flow diagram showing the steps of scenario baseline creation and planning according to an embodiment.

As shown by FIG. 2H, baseline data may be updated by the user to generate a "Scenario Baseline" which is used to estimate the future performance using the longer-term trending. The user may change various values and run the analysis and view the results. Scenario baselines can be saved or discarded by the user.

Figure 2I:
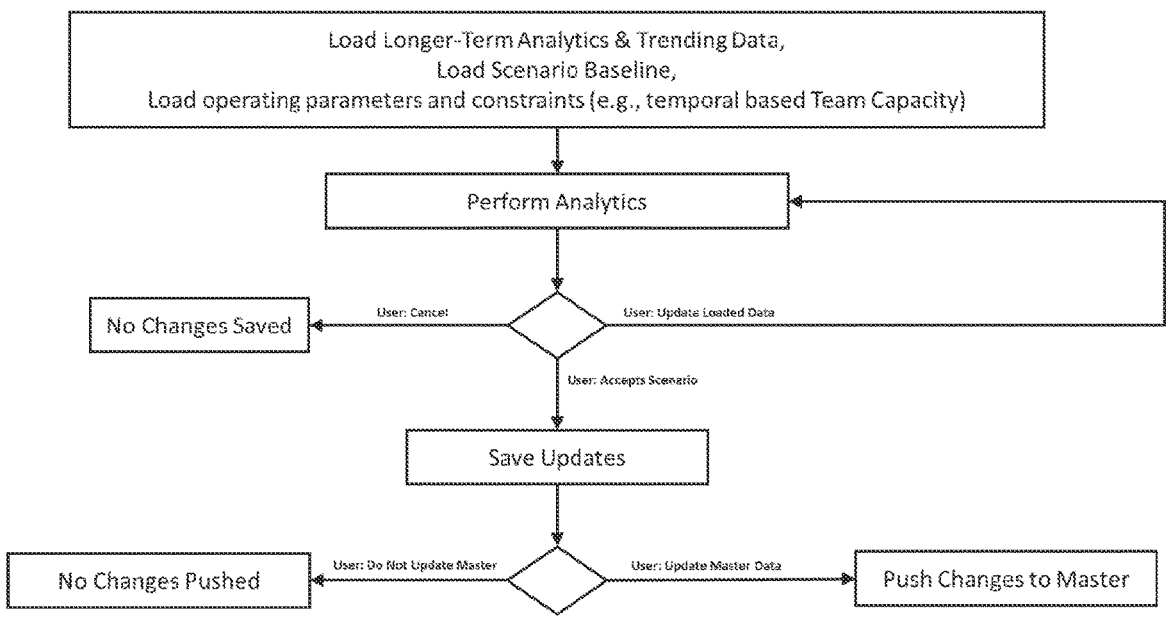

As shown in FIG. 2I, the user may "accept" changes to the project baseline in the project management module based on the estimation. Once the analysis is complete, all or part of the scenario baseline data can then be pushed to the master. Thus, preferred embodiments perform a form of simulation, where the user simulates changes before accepting them and updating the project planning software.

Embodiments of the present disclosure have been described with particular reference to the example illustrated. However, it will be appreciated that variations and modifications may be made to the examples described within the scope of the present disclosure.

The invention claimed is:

1. A computer-implemented method for processing project plan datasets provided by a project management module, the method comprising:
  receiving user input indicative of a first dataset of baseline data for a first period of time and a second dataset of baseline data for a second period of time from the project management module;
  importing the first dataset of baseline data and the second dataset of baseline data from a master database;
  mapping the first and second datasets of baseline data into data objects representing work task entities of project plans;
  based on fields in the datasets, identifying dependencies between individual work task entities of the project plans and creating links in the data objects to other data objects representing those dependencies;
  analysing, in an analytics engine, the first and second datasets to perform a range of validation checks for anomalies and issues that contravene predefined rules; and
  output to a user a report of the anomalies and issues, and automatically repair the anomalies and issues in the master database or generate user selectable controls to be presented to the user, which upon selection by the user cause the anomalies and issues in the master database to be repaired,
  wherein one or both of the first dataset and second dataset is constructed from a saved change-log associated with a project plan to create a virtual baseline.

2. The computer-implemented method of claim 1, wherein the first dataset is a current dataset and the second dataset is for a previous period of time, such that the analysis comprises an analysis of changes over time.

3. A computer-implemented method for processing project plan datasets provided by a project a management module, the method comprising:
receiving user input indicative of a first dataset of baseline data for a first period of time and a second dataset of baseline data for a second period of time from the project management module;
importing the first dataset of baseline data and the second dataset of baseline data from a master database;
mapping the first and second datasets of baseline data into data objects representing work task entities of project plans,
based on fields in the datasets, identifying dependencies between individual work task entities of the project plans and creating links in the data objects to other data objects representing those dependencies;
analysing, in an analytics engine, the first and second datasets to perform a range of validation checks for anomalies and issues that contravene predefined rules; and
output to a user a report of the anomalies and issues, and automatically repair the anomalies and issues in the master database or generate user selectable controls to be presented to the user, which upon selection by the user cause the anomalies and issues in the master database to be repaired,
wherein successive pairs of first and second datasets are analysed in turn to analyse trends over time.

4. A computer-implemented method for processing project plan datasets provided by a project management module, the method comprising:
receiving user input indicative of a first dataset of baseline data for a first period of time and a second dataset of baseline data for a second period of time from the project management module;
importing the first dataset of baseline data and the second dataset of baseline data from a master database;
mapping the first and second datasets of baseline data into data objects representing work task entities of project plans;
based on fields in the datasets, identifying dependencies between individual work task entities of the project plans and creating links in the data objects to other data objects representing those dependencies;
analysing, in an analytics engine, the first and second datasets to perform a range of validation checks for anomalies and issues that contraven predefined rules;
output to a user a report of the anomalies and issues, and automatically repair the anomalies and issues in the master database or generate user selectable controls to be presented to the user, which upon selection by the user cause the anomalies and issues in the master database to be repaired; and
in response to a user input, amending at least one attribute of a baseline to create a scenario baseline, upon which the analysis is performed.

5. The computer-implemented method of claim 4, further comprising receiving user input to update a live project plan dataset in the project management module with the at least one amended attribute based on the analysis of the scenario baseline.

6. A computer-implemented method for processing project plan datasets provided by a project management module, the method comprising:
receiving user input indicative of a first dataset of baseline data for a first period of time and a second dataset of baseline data for a second period of time from the project management module;
importing the first dataset of baseline data and the second dataset of baseline data from a master database;
mapping the first and second datasets of baseline data into data objects representing work task entities of project plans;
based on fields in the datasets, identifying dependencies between individual work task entities of the project plans and creating links in the data objects to other data objects representing those dependencies;
analysing, in an analytics engine, the first and second datasets to perform a range of validation checks for anomalies and issues that contravene predefined rules;
output to a user a report of the anomalies and issues, and automatically repair the anomalies and issues in the master database or generate user selectable controls to be presented to the user, which upon selection by the user cause the anomalies and issues in the master database to be repaired; and
presenting selectable templates which define particular user selected criteria for data set selection, data set filtering, and a report format.

7. The computer-implemented method of claim 6, further comprising automatically running, by a batch reporting module, said reports at periodic intervals according to user defined batch processing parameters.

8. The computer-implemented method of claim 6, further comprising automatically causing, by a reporting module, a report to be electronically communicated to one or more user specified recipients.

9. The computer-implemented method of claim 6, further comprising:
accepting datasets in plural formats from plural respective project management modules types; and
mapping said datasets into a common format.

10. A computer-implemented method for processing project plan datasets provided by a project management module, the method comprising:
receiving user input indicative of a first dataset of baseline data for a first period of time and a second dataset of baseline data for a second period of time from the project management module;
importing the first dataset of baseline data and the second dataset of baseline data from a master database;
mapping the first and second datasets of baseline data into data objects representing work task entities of project plans;
based on fields in the datasets, identifying dependencies between individual work task entities of the project plans and creating links in the data objects to other data objects representing those dependencies;
analysing, in an analytics engine, the first and second datasets to perform a range of validation checks for anomalies and issues that contravene predefined rules; and
output to a user a report of the anomalies and issues, and automatically repair the anomalies and issues in the master database or generate user selectable controls to be presented to the user, which upon selection by the user cause the anomalies and issues in the master database to be repaired,
wherein the analysis comprises one or more selected from a group consisting of:

a) checking where business rules have been broken, and issuing a warning in the report if it has been found that a rule has been broken, wherein the rules comprise one or more of: state checks, forward flow, adherence to lag and validation rules based on calendar data to indicate at least one of: lateness of deliverables, incorrect assignments in the originating tool of Iterations to Program Increments, and incorrect Program Increments and selection of the current Program Increment for the analytics;

b) wherein the first dataset is a current dataset and the second dataset is for a previous period of time, the analysis comprising identifying movement of work task entities in a time line by comparing the first and second datasets, identifying at least one feature that has moved forwards or backwards in time between the first and second datasets, and presenting the results in the report;

c) identifying relationships and dependencies between work task entities in the second dataset, displaying those relationships and dependencies in graphical form in the report, and indicating where those relationships and dependencies fail validation checks indicating violation of a business rule;

d) comparing the first and second dataset and identifying work task entities that have come into scope or out of scope and present the results in the report; and e) showing a work task entity delivery metric in numeric or graphic format against the original committed plan, optionally including the commitment and delivery of additional scope, and optionally including slip in delivered work task entities.

11. A computer-implemented method for processing project plan datasets provided by a project management module, the method comprising:

receiving user input indicative of a first dataset of baseline data for a first period of time and a second dataset of baseline data for a second period of time from the project management module;

importing the first dataset of baseline data and the second dataset of baseline data from a master database;

mapping the first and second datasets of baseline data into data objects representing work task entities of project plans;

based on fields in the datasets, identifying dependencies between individual work task entities of the project plans and creating links in the data objects to other data objects representing those dependencies;

analysing, in an analytics engine, the first and second datasets to perform a range of validation checks for anomalies and issues that contravene predefined rules; and output to a user a report of the anomalies and issues, and automatically repair the anomalies and issues in the master database or generate user selectable controls to be presented to the user, which upon selection by the user cause the anomalies and issues in the master database to be repaired, wherein the data in at least one report is groupable, the groups including one or more attributes or user tags, being one or more of Project Release, and then Team and then Epic and/or time period, wherein the user can actively collapse the groups.

12. The computer-implemented method of claim 6, further comprising processing, by the analytics engine, a user-readable language script for defining filters and/or parameters for reports to be generated, wherein the method comprises storing user generated scripts with the report template.

13. The computer-implemented method of claim 10, further comprising identifying at least one work task entity in a dataset that fails a validation check and displaying output to the user indicating the failed validation check, receiving user input to correct the entity, and, via a data change handler, automatically correcting the issue in the project management module live datastore.

14. The computer-implemented method of claim 10, further comprising:

accepting datasets in plural formats from plural respective project management modules types; and mapping said datasets into a common format.

* * * * *